United States Patent
Mesde et al.

(10) Patent No.: US 12,254,310 B2
(45) Date of Patent: Mar. 18, 2025

(54) VEHICLE APPLICATION DEPLOYMENT SYSTEM WITH PRE-DETERMINED FALLBACK DEPLOYMENTS

(71) Applicant: Amazon Technologies, Inc., Seattle, WA (US)

(72) Inventors: Roland Mesde, Cupertino, CA (US); Alex Bessonov, San Jose, CA (US); Brian Ewanchuk, Redmond, WA (US); George Sherif Kamal Hanna, Toronto (CA); Paolo Gruenberg Hilario, West Linn, OR (US)

(73) Assignee: Amazon Technologies, Inc., Seattle, WA (US)

( * ) Notice: Subject to any disclaimer, the term of this patent is extended or adjusted under 35 U.S.C. 154(b) by 167 days.

(21) Appl. No.: 18/194,008

(22) Filed: Mar. 31, 2023

(65) Prior Publication Data
US 2024/0329963 A1 Oct. 3, 2024

(51) Int. Cl.
*G06F 8/65* (2018.01)

(52) U.S. Cl.
CPC ...................... *G06F 8/65* (2013.01)

(58) Field of Classification Search
None
See application file for complete search history.

(56) References Cited

U.S. PATENT DOCUMENTS

| | | | |
|---|---|---|---|
| 8,719,782 B2 | 5/2014 | DeHaan | |
| 8,869,135 B1 | 10/2014 | Fitzgerald | |
| 9,880,837 B2 | 1/2018 | Khazanchi et al. | |
| 10,025,583 B2 * | 7/2018 | Butler | G06F 8/65 |
| 11,314,495 B2 | 4/2022 | Francis | |

(Continued)

FOREIGN PATENT DOCUMENTS

CN 113934198 A * 1/2022

OTHER PUBLICATIONS

Stefan Boschert, "Next Generation Digital Twin," Conference Paper May 2018, ResearchGate, in Proceedings of TMCE 2018, pp. 209-218.

(Continued)

*Primary Examiner* — Philip Wang
(74) *Attorney, Agent, or Firm* — Alexander A. Knapp; Kowert, Hood, Munyon, Rankin & Goetzel, P.C.

(57) ABSTRACT

Systems and methods for providing vehicle software deployment plans that include one or more fallback deployment plans are disclosed. In some embodiments, a vehicle software deployment system determines a deployment plan for deploying one or more software applications one or more electronic control units (ECUs) of a vehicle. Additionally, for one or more failure scenarios, the vehicle software deployment system determines one or more respective fallback deployment plans, such as a deployment plan that assumes one of the ECUs of the vehicle has failed. A deployment plan bundle is provided to the vehicle, comprising a primary deployment plan as well as the one or more fallback deployment plans. In the event that one of the failure scenarios takes place with respect to the vehicle, a deployment agent of the vehicle automatically deploys one of the fallback deployment plans that was provided with the deployment bundle.

20 Claims, 19 Drawing Sheets

(56) References Cited

U.S. PATENT DOCUMENTS

| | | | |
|---|---|---|---|
| 2008/0320109 A1* | 12/2008 | Andrews | G06F 8/65 709/220 |
| 2015/0100671 A1 | 4/2015 | Song | |
| 2018/0060456 A1 | 3/2018 | Phatak et al. | |
| 2019/0384870 A1 | 12/2019 | Shiraishi et al. | |
| 2020/0218531 A1* | 7/2020 | Kushwaha | G06F 8/66 |
| 2020/0361493 A1* | 11/2020 | Kawauchi | G06F 11/3013 |
| 2021/0264252 A1 | 8/2021 | Davis | |
| 2021/0320736 A1* | 10/2021 | Li | H04J 3/065 |
| 2022/0078077 A1 | 3/2022 | Mifsud | |
| 2022/0237958 A1 | 7/2022 | Tzamaloukas et al. | |
| 2022/0317986 A1 | 10/2022 | Francis et al. | |
| 2022/0324469 A1* | 10/2022 | Ye | B60W 50/035 |
| 2022/0326931 A1* | 10/2022 | Choi | B60W 50/14 |
| 2022/0350336 A1 | 11/2022 | Gyllenhammar | |
| 2024/0192940 A1* | 6/2024 | Mesde | G06F 8/60 |
| 2024/0192943 A1* | 6/2024 | Mesde | G06F 8/65 |
| 2024/0329964 A1* | 10/2024 | Mesde | G06F 8/60 |
| 2024/0330170 A1 | 10/2024 | Mesde et al. | |
| 2024/0333802 A1* | 10/2024 | Mesde | H04L 67/56 |

OTHER PUBLICATIONS

U.S. Appl. No. 18/065,565, filed Dec. 13, 2022, Roland Mesde, et al.
U.S. Appl. No. 17/710,585, filed Mar. 31, 2022, Roland Mesde, et al.
U.S. Appl. No. 17/710,634, filed Mar. 31, 2022, Roland Mesde, et al.
U.S. Appl. No. 17/710,644, filed Mar. 31, 2022, Roland Mesde, et al.
U.S. Appl. No. 17/806,434, filed Jun. 10, 2022, Roland Mesde, et al.
U.S. Appl. No. 17/809,878, filed Jun. 29, 2022, Roland Mesde, et al.
U.S. Appl. No. 17/809,868, filed Jun. 29, 2022, Roland Mesde, et al.
U.S. Appl. No. 18/194,370, filed Mar. 31, 2023, Roland Mesde, et al.
U.S. Appl. No. 17/037,376, filed Sep. 29, 2020, Michael Garcia, et al.
U.S. Appl. No. 17/710,551, filed Mar. 31, 2022, Rloand Mesde, et al.
U.S. Appl. No. 17/810,301, filed Jun. 30, 2022, Roland Mesde, et al.
U.S. Appl. No. 18/194,391, filed Mar. 31, 2023, Roland Mesde, et al.

* cited by examiner

VEHICLE APPLICATION DEPLOYMENT SYSTEM WITH PRE-DETERMINED FALLBACK DEPLOYMENTS

BACKGROUND

Modern vehicles, such as cars, trucks, motorcycles, etc. are often manufactured with electronic sensors and include computer systems programmed with control algorithms that take inputs from such electronic sensors to determine various control actions to be taken for the vehicle or systems implemented in the vehicles. Some vehicles may include multiple electronic control units (ECUs) and sensors having various sensor modalities. Additionally, deployment of a vehicle software application may require that the vehicle software application be tested and certified on vehicles equipped with the multiple ECUs and sensors.

Also, different vehicles may have different system configurations (e.g., different ECU configurations, bus network configurations, software configurations, etc.). Often times, vehicle applications may be deployed to vehicles in configurations that enable the applications to function, but that may not fully utilize vehicle resources or software dependencies in an efficient manner (e.g., a configuration may be a feasible configuration, but also a sub-optimal configuration).

Additionally, vehicle components, such as ECUs, network elements, etc. may fail. Such failures may cause resources required to implement a software application to become unavailable, which in turn may degrade performance of the application and/or cause the application to no longer function as designed.

Figure 1:
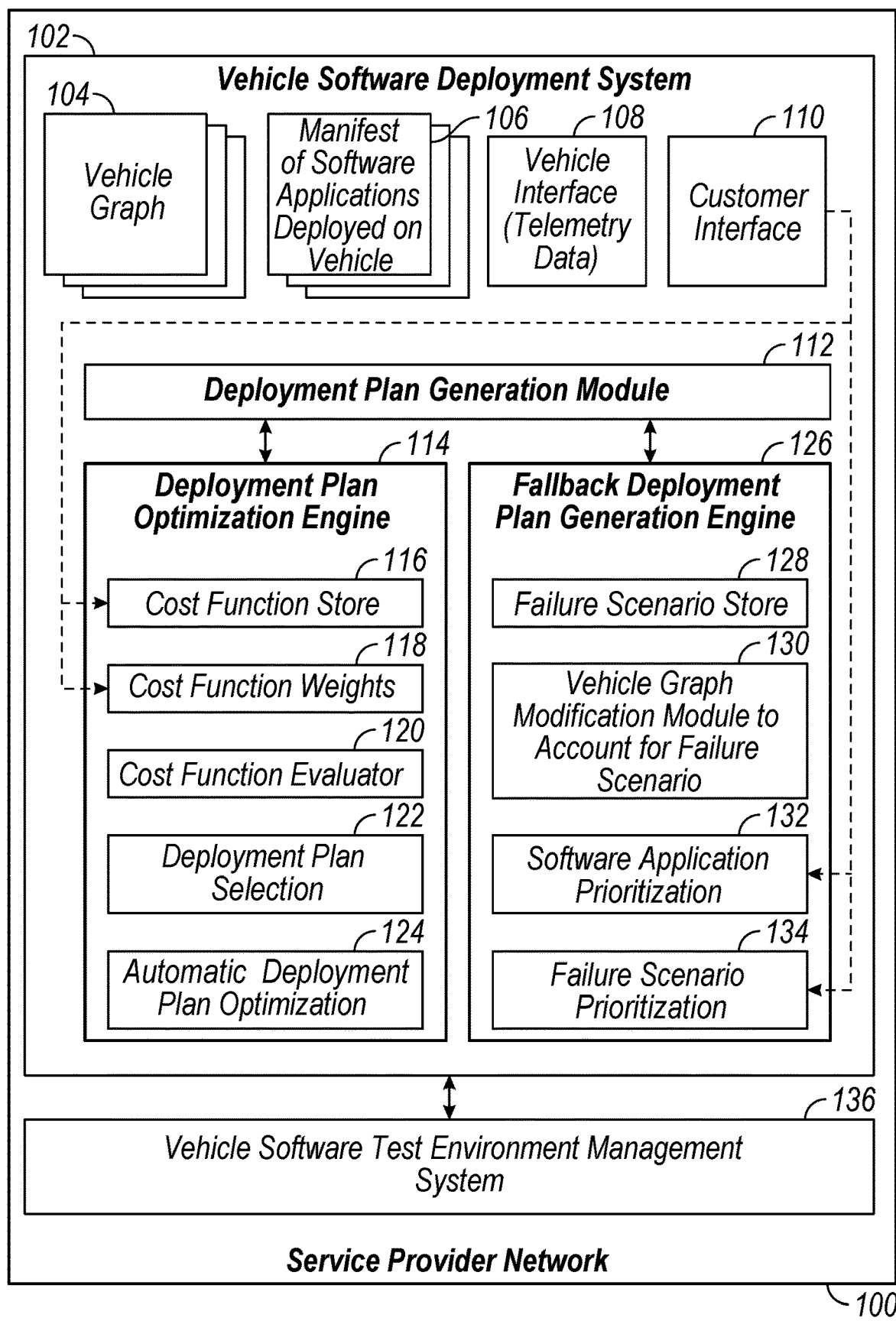
FIG. 1 illustrates a service provider network that includes a vehicle software deployment system and a vehicle software test environment management system, wherein the vehicle software deployment system further includes a deployment plan generation module, a deployment plan optimization engine, and a fallback deployment plan generation engine, according to some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (e.g., meaning must). Similarly, the words "include," "including," and "includes" mean including, but not limited to.

DETAILED DESCRIPTION OF EMBODIMENTS

The systems and methods described herein relate to deployment of vehicle software applications to one or more vehicles, wherein an optimized placement and/or fallback placement is determined. For example, software applications may be installed and implemented (e.g., deployed) on electronic control units (ECUs) of a vehicle and may require certain resources, such as inputs, computing capacity, memory, storage, and/or access to output network connections in order to function properly. As a specific example, a given vehicle software application may require access to inputs A, B, and C, as well as require access to computing capacity X and memory allocation Y, and may further require access to a local bus or network Z. Thus, for the example vehicle software application being discussed to perform as intended by a software designer, the example vehicle software application may need to be placed on an ECU in the vehicle in a domain that has access to inputs A, B, and C, wherein the selected ECU has available compute capacity X and available memory Y, and is further connected to a bus or network Z. As can be seen, determining a placement location (e.g., deployment plan) for a vehicle software application is not as simple as merely identifying a computing resource with available compute capacity. Moreover, typically other vehicle software applications will also need to be deployed to the vehicle, wherein a placement location of a given vehicle software application affects placement options for other vehicle software applications. Additionally, some vehicle software applications may have dependencies on one another. For example, a result calculated by a first vehicle software application may be a required input for another vehicle software application. Thus, vehicle software application dependencies may be yet another factor considered in determining a deployment plan.

Also, vehicle configurations (both hardware and software) may change over time. For example, new hardware (which may include ECUs or which may utilize ECU resources of existing ECUs) may be installed. Also, new vehicle software applications may be installed, wherein the new vehicle software applications utilize resource capacities of the vehicle (such as ECU compute capacity, ECU memory capacity, bus bandwidth, etc.). Due to these changes, conditions that formed a basis for determining an initial (or preceding) deployment plan may be altered or rendered obsolete. Thus, in some embodiments, there may be an opportunity to improve performance of the vehicle, and performance of its installed vehicle software applications, by determining an updated deployment plan that takes into consideration the changed environment of the vehicle (e.g., changes in hardware and/or software). The updated deployment plan may further be provided to the vehicle to update a deployment configuration of one or more vehicle software applications already implemented on the vehicle.

Additionally, vehicle components may fail over time. For example, an ECU or a vehicle bus may fail. In such situations, the vehicle subsequent to the failure may have fewer available resources to be used to implement vehicle software applications as compared to prior to the failure. Also, failures may cause an imbalance between available compute resources and input/output connectivity. For example, with regard to a given vehicle software application installed on a first ECU, subsequent to a failure there may be remaining computing capacity available on an alternate ECU (e.g., $2^{nd}$ ECU), but the alternate ECU may not have access to the same inputs, buses, or networks as the first ECU. Thus, simply moving the given vehicle software application from the first ECU to the alternate ECU may not be a viable placement option. However, there may be other vehicle software applications implemented on a third ECU that could be implemented on the alternate ECU, wherein the third ECU has access to the same inputs, buses, or networks as the first ECU. Thus, in some embodiments, changing a placement of one or more vehicle software applications currently placed on the third ECU to instead be placed on the alternate ECU may free up capacity at the third ECU for placement of the given vehicle software application previously placed on the first ECU (that has failed). As can be seen, determining a fallback deployment plan may involve finding placement locations for software applications previously placed on a failed component, but may also involve moving placement locations of software applications currently placed on non-failed components in order to rebalance available compute resources and input/output connectivity in a way that minimizes the impact of the failure.

In some situations, vehicle components may fail without warning and/or the failures may take place when the vehicle is not connected to a network. Thus, in order to avoid vehicle component failures resulting in overall vehicle failure (or inoperability), it may be beneficial to have fallback deployment plans locally stored on the vehicle. In some embodiments, a vehicle may store multiple fallback deployment plans that have been pre-generated to account for various failure scenarios. In such embodiments, when a failure takes place that corresponds to one of the various failure scenarios for which fallback deployment plans have been pre-generated, a local deployment agent of the vehicle may select and implement a stored pre-generated fallback deployment plan that corresponds to the current failure state of the vehicle. This may enable the vehicle to continue to function in a safe manner despite suffering a component failure. In some embodiments, wherein vehicle software applications require performance testing and certification prior to use in a vehicle, such performance testing and certification may be performed for a primary deployment plan and one or more fallback deployment plans (prior to initial deployment). This testing and certification may be performed ahead of time, e.g., prior to failure, such as prior to (or as a part of) generating the primary and fallback deployment plans. In some embodiments, the primary and one or more fallback deployment plans may be bundled together in a deployment plan bundle provided to the vehicle as part of an initial or updated deployment. Thus, when the vehicle suffers a failure, the vehicle may simply implement an already generated and certified fallback deployment plan that is locally stored on the vehicle in order to enable the vehicle to continue operating without access to the failed vehicle component.

In some embodiments, a fallback deployment plan may prioritize vehicle software applications and/or functionality of respective ones of the vehicle software applications over other vehicle software applications or features. For example, some vehicle software applications that provide optional features that are not strictly required for use of the vehicle may be omitted in a fallback deployment plan. As an example, some infotainment related vehicle software applications may be omitted in a fallback deployment plan in order to free up computing resources to implement other higher priority vehicle software applications. Thus, in some embodiments, the fallback deployment plan may provide the vehicle sufficient operability to, for example, drive back to a service center. However, the fallback deployment plan may be a less desirable deployment option than the primary deployment plan, and may therefore be viewed as a temporary configuration that is useful to enable the vehicle to continue to operate until the failed component can be replaced.

In some embodiments, a vehicle software deployment system may determine updated deployment plans based on changed conditions, wherein the updated deployment plans may include updated primary deployment plans and/or updated fallback deployment plans. For example, a vehicle software deployment system, which may be implemented remotely from the vehicle (such as in a cloud-based configuration) may receive telemetry information from the vehicle indicating changed conditions of the vehicle, such as the addition or removal of hardware and/or the addition or removal of software. Also, the vehicle software deployment system may receive updated customer preferences, wherein a customer (such as a vehicle original equipment manufacturer (OEM) or third-party parts supplier) provides updated preferences regarding cost functions to be used in determining an optimized deployment plan, updated weightings to be used in the cost functions, and/or updated failure scenarios to consider. Based on the changed conditions (in the vehicle, with regard to customer preferences, or both) the vehicle software deployment system may determine an updated primary deployment plan and/or one or more updated fallback deployment plans. In some embodiments, the vehicle software deployment system may continuously or periodically monitor telemetry data from the vehicle and/or stored customer preferences to identify changes, and in response to detecting changes, may automatically initiate the generation of updated deployment plans. Furthermore, the vehicle software deployment system may automatically cause the updated deployment plans (primary and/or fallback) to be sent to the vehicle to update a deployment configuration of the vehicle.

In some embodiments, an orchestration agent of the vehicle may automatically implement the updated deployment plans. For example, when the vehicle is not in use (such as at night) the orchestration agent may perform a software update on the vehicle that implements a configuration indicated in the updated deployment plan. Also, previously stored fallback deployment plans may be replaced with updated fallback deployment plans.

In some embodiments, the automatic generation and implementation of updated deployment plans may enable a vehicle to "self-heal". For example, if an after-market component (software or hardware) is installed on a vehicle, wherein the aftermarket component frustrates an existing configuration of the vehicle, the vehicle software deployment system may automatically determine an updated deployment that resolves the issue and the local orchestration agent of the vehicle may implement the determined updated deployment plan. Thus, from the perspective of the vehicle owner or operator, the vehicle may "self-heal" without any intervention required by the owner or operator to resolve the issue caused by the installation of the aftermarket component, as an example.

In some embodiments, alternatively or additionally, a vehicle software deployment system may receive fleet-wide data and use the fleet-wide data to draw inferences about a given fleet of vehicles, wherein the inference may further be used to update weights and/or cost functions used to determine an optimized deployment. For example, the vehicle software deployment system may receive granular data, such as at the granularity of an individual vehicle, and may use the granular data to determine configuration changes of the individual vehicle and also receive less granular data, such as data representing a class of vehicles (e.g., a fleet). This less granular data may be used to determine characteristics of a fleet. For example, the fleet-wide data, as an example, may indicate that a given ECU in a given vehicle make, model, and year has a high latency when communicating over a given bus to another given ECU. In such an example, a vehicle software deployment system may perform data analytics on the fleet-wide data to generate an inference indicating the high latency between the two given ECUs. The vehicle software deployment system may further adjust a cost function to put a higher cost weighting on communications between the two given ECUs. This may then discourage placement of software applications that communicate with one another and which require low latency communications from being placed on the two given ECUs. Note, that while the high latency communication issue between the two given ECUs may not be easily discernible in the granular individual vehicle telemetry data, the high latency issue between the two given ECUs may be inferred when analyzing the larger fleet-wide data set, for a fleet of vehicles comprising vehicles including the two given ECUs in a same or similar configuration.

In some embodiments, ongoing optimization of vehicle software application placement may balance several cost factors, such as resource costs, isolation costs, etc. Resource costs may include, but are not limited to, processor resource usage, energy usage, network usage, memory usage, storage usage, etc. Isolation costs may include, but are not limited to, costs associated with a placement with limited access to input information, costs associated with lack of output connections to provide results to intended recipients, costs associated with co-located failure probabilities, etc. In some embodiments, weighting factors that take into account the relative importance of these costs may be used in costs functions. For example, energy usage may be weighted differently than network usage in a resource cost function. In some embodiments, default weightings may be used and may be updated based on inferences drawn from fleet-wide data (or from individual vehicle data). For example, fleet-wide data may indicate that a cost associated with heat dissipation may be an issue in one geographic region, such as the sunbelt region of the United States, whereas heat dissipation may not be an issue in another geographic region, such as in the New England region of the United States. Thus, different weightings may be used when determining deployment plans for vehicles belonging to different fleets, wherein, in this example, a fleet is defined based on geographic location of the vehicles. However, fleets may also be defined based on various other criteria, such as vehicle manufacturer, vehicle model, vehicle trim level, vehicles having certain features, etc. Also, in some embodiments, a customer may provide criteria for customer-defined fleets.

In some embodiments, ongoing optimization of vehicle software application placement may adjust placements (via an updated deployment plan or an updated fallback deployment plan) based on changes in vehicle configurations discovered from telemetry data received from the vehicle. Also, ongoing optimization of vehicle software application placement may include generating a new deployment plan for a vehicle based on updated weightings determined for use in cost functions, even if the configuration of the vehicle has not changed. For example, an inference may be drawn from fleet-wide vehicle data that a given ECU is likely to overheat in the summer in the Southern United States when application X is deployed to the given ECU. Thus, an updated deployment plan may be generated for vehicles in the Southern United States to place application X on a different ECU, even if the configuration of the vehicles has not changed.

In some embodiments, a vehicle software deployment system may select optimized deployment plans from a set of deployment plans for which performance testing has already been performed and for which the certification has already been achieved for the respective software applications of the deployment plan. In some embodiments, optimized deployment may be selectively implemented for software applications that do not require certification. For example, software applications requiring certification may remain deployed in a configuration matching a configuration used for testing and certification, but other software applications that do not require certification may be re-deployed in new configurations that are determined feasible by the vehicle software deployment system, but for which performance testing and certification has not been performed (and is not required to be performed). Also, in some embodiments, a vehicle software deployment system may initiate performance testing and certification for deployment plans that are generated in order to optimize deployment. As further discussed herein, in some embodiments, a vehicle software deployment system may interact with a vehicle software test environment management system in order to perform testing using real-world or virtualized vehicles.

In some embodiments, a vehicle software deployment system may perform a deterministic evaluation for an initial deployment of a software application and then may later optimize the placement based on collected telemetry data and/or fleet-wide data. In some embodiments, a first step in determining a placement for a vehicle software application may be a feasibility analysis, e.g., is placement feasible given the resource and connectivity requirements of the vehicle software application and the available resources and placement options available on the vehicle. However, often there may be more than one feasible placement location option, in which case a vehicle software deployment system may further select an optimized placement location from among the feasible placement locations. In some embodiments, vehicle software applications may initially be placed deterministically at feasible placement locations, and subsequent deployment plans may be generated to optimize the placements using the deterministically determined placements as a starting point for the optimization.

With regard to fallback deployment plans, as mentioned above, in some embodiments, a deployment agent executing locally on a vehicle may perform automated failover to reconfigure a vehicle in response to a failure, even if the vehicle is not connected to the vehicle software deployment system (e.g., the vehicle is offline). Also, as mentioned above, the fallback deployment plans may be selected such that the respective deployment configurations of the fallback deployment plans satisfy certification requirements for the vehicle software applications being re-deployed. This may allow a vehicle to suffer a component failure while not connected to the vehicle software deployment system (e.g., no network connection is available) and nevertheless seamlessly transition to a fallback deployment configuration that satisfies certification requirements.

In some embodiments, a vehicle software deployment system may receive or access a vehicle graph that indicates ECUs included in a given vehicle and their respective connections (e.g., network links and/or buses that connect the ECUs). In some embodiments, the vehicle software deployment system may maintain an up-to-date vehicle graph, wherein updates are made to an initial vehicle graph based on changes detected in telemetry data received from the vehicle. In some embodiments, a customer (such as an OEM or parts supplier) may provide the vehicle software deployment system with an initial vehicle graph for a given vehicle and the vehicle software deployment system may then update the vehicle graph based on detected changes. In some embodiments, a vehicle shadow service may maintain vehicle graphs as part of vehicle shadows maintained for a fleet of vehicles. In such embodiments, the vehicle software deployment system may retrieve or otherwise access a vehicle graph for a given vehicle from a vehicle shadow maintained for the given vehicle.

In some embodiments, customers may provide failure scenarios for which fallback deployment plans are to be generated. Also, in some embodiments, a vehicle software deployment system may determine failure scenarios to be used to determine fallback deployment plans. For example, fleet-wide data may be used to infer failure modes of vehicle components belonging to various fleets and the vehicle software deployment system may generate fallback deployment plans corresponding to the failure modes inferred from collected data.

In some embodiments, in order to determine a fallback deployment plan for a given failure scenario, a vehicle graph for a given vehicle may be modified to implement the given failure scenario. For example, if the failure scenario involves a certain ECU failing, the vehicle graph may be modified to not include the failed ECU (or otherwise make the failed ECU not available for deployment of software applications). In this way, a feasible deployment plan can be determined within the constraints resulting from the given failure scenario. Furthermore, for vehicle software applications requiring a certified deployment configuration, the fallback deployment plan may be pre-certified. For example, in some situations a fallback deployment plan may correspond to a deployment plan that has already been tested and certified, in which case the certification may be verified prior to selection of the fallback deployment plan as a fallback deployment plan to be included in a deployment bundle for transmission to the given vehicle. However, in other situations a determined fallback deployment plan may not correspond to a deployment plan that has already been certified. In such situations, a vehicle software deployment system may initiate a certification process in order to certify the placement configurations of the software applications requiring certification in the particular arrangement that has been included the proposed fallback deployment plan. Thus, a fallback deployment plan included in a deployment bundle for transmission to a vehicle may include pre-certified deployments that were either selected from a set of pre-certified deployment plans or that were specifically certified in order to prepare the deployment bundle.

FIG. 1 illustrates a service provider network that includes a vehicle software deployment system and a vehicle software test environment management system, wherein the vehicle software deployment system further includes a deployment plan generation module, a deployment plan optimization engine, and a fallback deployment plan generation engine, according to some embodiments.

In some embodiments, service provider network 100 includes vehicle software deployment system 102 and vehicle software test environment management system 136. Additional details regarding vehicle software test environment management system 136 are described in FIG. 18. Also, additional details regarding the vehicle software deployment system 102 are described in FIGS. 1-17.

Service provider network 100 may be set up by an entity such as a company or a public sector organization to provide one or more services (such as various types of cloud-based computing or storage services) accessible via the Internet and/or other networks to customers. Service provider network 100 may be a cloud provider network (sometimes referred to simply as a "cloud"), which refers to a pool of network-accessible computing resources (such as compute, storage, and networking resources, applications, and services), which may be virtualized. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

In some embodiments, vehicle software deployment system 102 and vehicle software test environment management system 136 may be implemented using cloud-computing resources of service provider network 100, such as virtualized computing instances implemented on computing devices of service provider network 100.

In some embodiments, vehicle software deployment system 102 stores or otherwise has access to vehicle graphs 104 and manifests of software applications already deployed on monitored vehicles 106. Additionally, vehicle software deployment system 102 includes an interface for receiving telemetry data from monitored vehicles 108 and a customer interface 110. For example, wireless communications received from the monitored vehicles may be routed to vehicle interface 108 and the vehicle software deployment system may provide customers an application programmatic interface or other type of interface (e.g., customer interface 110) configured to receive input from customers, such as regarding cost preferences, cost weightings, failure scenarios to be considered, application prioritizations, etc. In some embodiments, the customers may include original equipment manufacturers (OEMs) and/or parts suppliers. In some embodiments, customers may provide initial vehicle graphs and initial software manifests to the vehicle software deployment system 102. In such embodiments, the vehicle software deployment system 102 may automatically update the provided vehicle graphs 102 and software manifests 106 to reflect changes identified in received vehicle telemetry data 108 and to reflect changes initiated via updated deployment plans.

In some embodiments, customers may encompass any type of customer configured to submit requests to service provider network 100. For example, a given customer may interact using a suitable version of a web browser, or may include a plug-in module or other type of code module configured to execute as an extension to or within an execution environment provided by a web browser. Alternatively, a customer may interact using an application such as a database application (or user interface thereof), a media application, an office application or any other application. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, customers may be configured to generate network-based services requests according to a Representational State Transfer (REST)-style network-based services architecture, a document- or message-based network-based services architecture, or another suitable network-based services architecture.

Customers may convey network-based services requests to service provider network 100 via an external network. In various embodiments, such an externa network used for communicating with service provider network 100 may encompass any suitable combination of networking hardware and protocols necessary to establish network-based communications between customers and service provider network 100. For example, a network may generally encompass the various telecommunications networks and service providers that collectively implement the Internet. A network may also include private networks such as local area networks (LANs) or wide area networks (WANs) as well as public or private wireless networks.

In some embodiments, vehicle software deployment system 102 may further include a deployment plan generation module 112 configured to determine feasible deployment plans for software applications to be deployed to a given vehicle using an up-to-date vehicle graph 104 of the given vehicle, along with information about applications already deployed on the given vehicle, as indicated in a corresponding vehicle software manifest 106 for the given vehicle.

In some embodiments, the vehicle software deployment system 102 may further include a deployment plan optimization engine 114 and/or a fallback deployment plan generation engine 126. The deployment plan optimization engine 114 may further include a cost function store 116, a store for weights 118, wherein the weights are to be used in the cost functions stored in cost function store 118, depending on inferences drawn from fleet-wide data and/or based on customer weighting preferences. Additionally, deployment plan optimization engine 114 includes cost function evaluator 120, which may evaluate a given cost function selected for use, wherein the cost function is stored in cost function store 116. Additionally, the cost function evaluator 120 may insert the appropriate weightings in the cost function, and may further determine a cost value associated with one or more potential deployment plans. For example, when there is more than one feasible deployment option, respective costs may be determined for each option, and a given option to be implemented may be selected based on its relative cost as compared to other feasible deployment plan options. In some embodiments, costs may be determined in multiple dimensions, and such dimensions may be combined into a common cost function or multiple costs functions may be used. For example, a resource cost function may be used to determine an efficiency score in a resource usage dimension and a separate isolation cost function may be used to determine a communication flexibility score in a communication isolation dimension. In such embodiments, respective costs may be summed to determine an overall cost for a given deployment option. Also, in such embodiments, costs in different dimensions may be weighted differently in the overall cost, for example based on customer preferences.

In some embodiments, the deployment plan optimization engine 114 may include a deployment plan selection module 122 that selects a given deployment plan from a set of feasible deployment plans generated by deployment plan generation module 112. The deployment plan selection module 122 may select the given deployment plan from the set of feasible deployment plans based on respective overall costs determined for each of the feasible deployment plans by cost function evaluator 120.

As shown in FIG. 1, in some embodiments customers may adjust cost functions to be used and/or weightings to be used via customer interface 110.

Also, in some embodiments, deployment plan optimization engine 114 includes automatic deployment plan optimization module 124. The automatic deployment plan optimization module 124 may monitor telemetry data received via vehicle interface 108, or may monitor graph 104 for updates (where the updates are performed in response to changes indicated in telemetry data received via vehicle interface 108). Additionally, automatic deployment plan optimization module 124 may monitor cost function store 116 and/or cost function weights 118 for changes in cost functions and/or weightings to be used for optimized placement of software applications on the given vehicle. In response to detecting changes greater than a threshold level of change (either in vehicle configuration or in optimization weights/cost functions), the automatic deployment plan optimization module 124 may cause the deployment plan generation module 112 to generate an updated set of feasible deployment plans based on an updated (or current) vehicle graph 104. Also, the automatic deployment plan optimization module 124 may cause the cost function evaluator 120 to determine updated overall costs for the newly generated feasible deployment plans, wherein the updated overall costs are evaluated using the latest cost functions and latest weightings stored in cost function store 116 and cost function weighting store 118. The deployment plan selection module 122 may then select an updated deployment plan based on the determined costs for the newly generated feasible deployment plans. Additionally, the updated deployment plan may be provided for transmission to the given vehicle.

On the vehicle, a deployment orchestration agent may receive the updated deployment plan and may cause the updated deployment plan to be automatically implemented on the vehicle. In some embodiments, the updated deployment plan may be sent with metadata indicating an implementation priority for the updated deployment plan. For example, some updated deployment plans may be marked as being appropriate to implement during opportune times, such as at night when the vehicle is not in use. Other updated deployment plans may include more critical updates and may be marked for immediate, or more quickly executed implementation. In some embodiments, the deployment orchestration agent may provide an indication in vehicle telemetry data that the updated deployment plan has been implemented and the vehicle software deployment system 102 may update the corresponding vehicle graph 104 and software manifest 106 for the given vehicle.

Figure 5:
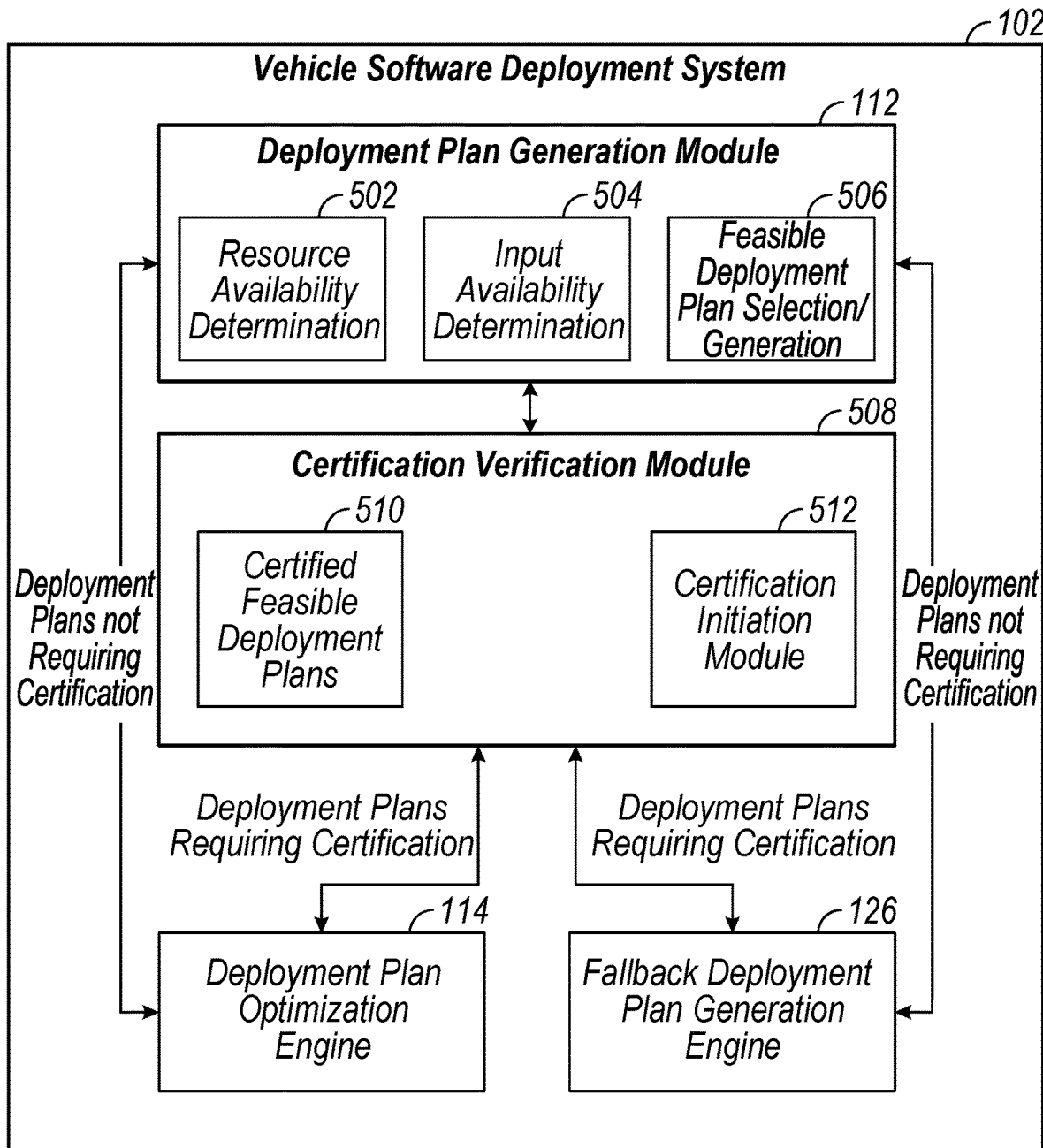
FIG. 5 illustrates an example vehicle software deployment system that further includes a certification verification module configured to ensure software applications requiring certification are certified in a given deployment arrangement corresponding to a selected deployment plan (primary or fallback, optimized or just feasible), according to some embodiments.

As discussed in more detail in regard to FIG. 5, in some embodiments, a certification verification module 508 may be included in the vehicle software deployment system 102 with the deployment plan generation module 112 and the deployment plan optimization engine 114 (or may be implemented in other configurations) to ensure that certification requirements are met for software applications impacted by an updated deployment plan.

In some embodiments, fallback deployment plan generation engine 126 includes a failure scenario store 128, a vehicle graph modification module 130 used to account for a given failure mechanism being evaluated, a software application prioritization module 132, and failure scenario prioritization module 134. Additional details regarding the fallback deployment plan generation engine 126 are further described with regard to FIG. 10.

Figure 2:
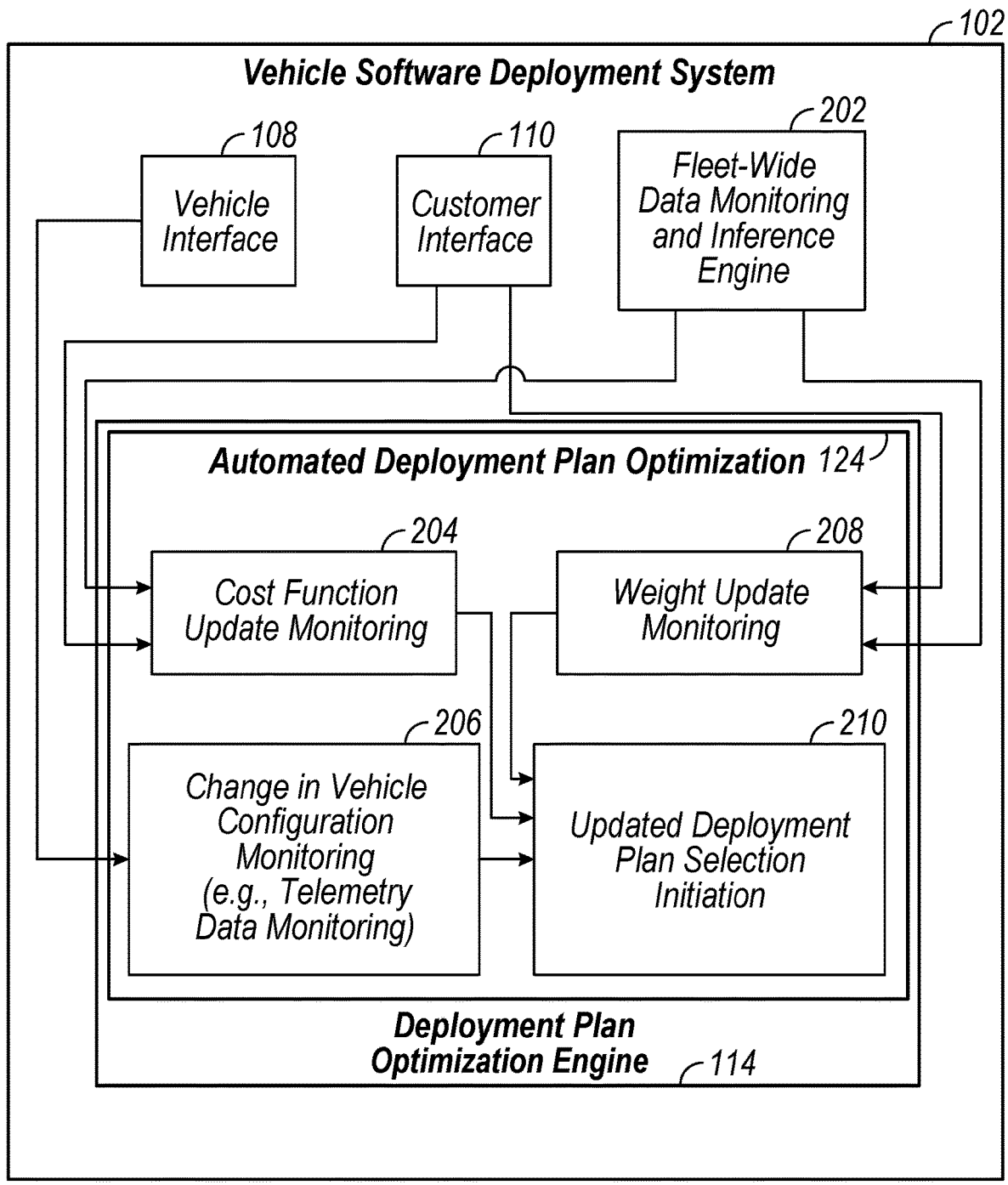
FIG. 2 illustrates an example automated deployment plan optimization module that may be included in the deployment plan optimization engine, according to some embodiments.

FIG. 2 illustrates an example automated deployment plan optimization module that may be included in the deployment plan optimization engine, according to some embodiments.

In some embodiments, an automated deployment plan optimization module, such as the automated deployment plan optimization module 124 illustrated in FIG. 1, may further include sub-components as shown in FIG. 2. For example, automated deployment plan optimization module 124 (which may be included in deployment plan optimization engine 114, which is not shown in FIG. 2 for case of illustration) may include a cost function update monitoring agent 204 and a weight update monitoring agent 208. In some embodiments, the cost function update monitoring agent may receive information from customer interface 110 indicating that a customer has selected to use different cost functions for determining an optimized deployment, or that the customer has provided customer generated cost functions. The cost function update monitoring agent may in turn update the cost functions stored in cost function store 116. Additionally, cost function update monitoring agent may receive inferences or other information from fleet-wide data monitoring and inference engine 202 indicating that different cost functions are to be used to determine an optimized deployment.

In some embodiments, fleet-wide vehicle data may be collected from vehicles enrolled with the vehicle software deployment system. Also, customers, such as OEMs and part suppliers may also provide fleet-wide data. The fleet-wide data may be analyzed by fleet-wide data monitoring and inference engine to determine inferences about relationships in the data. For example, the fleet-wide data monitoring and inference engine 202 may determine placements of software applications on a particular ECU perform sub-optimally when requiring inputs from another particular ECU in a certain make, model, or trim-level of vehicles. Based on such inferences the fleet-wide data monitoring and inference engine may determine updated weightings (and/or updated cost functions) to be use for determining a placement. For example, in the ECU configuration discussed above as an example inference, the fleet-wide data monitoring and inference engine may increase a weighting for intra-ECU communications. This updated weighting may then be used in a cost function, and in this particular example, may skew the costs in a way that encourages placement of the software application on an ECU more closely linked to the required inputs and therefore avoids the issue regarding communications between the two particular ECUs which was identified by the fleet-wide data monitoring and inference engine. In some embodiments, various fleet definitions may be used, as further discussed with regard to FIG. 4.

In addition to changes initiated by fleet-wide data monitoring and inference engine 202, changed customer preferences may be received via customer interface 110. For example, a customer may indicate (or change) a preference regarding which cost functions are to be used to determine optimized placement. Also, the customer may indicate changed customer preferences with regard to what weighting factors are to be used to determine an optimized placement. In some embodiments, weight update monitoring agent 208 may poll customer interface 110 for updates and/or customer interface 110 may forward updates to weight update monitoring agent 208. In a similar manner, cost function update monitoring agent 204 may used a push or pull mechanism to receive updates from customer interface 110 or fleet-wide data monitoring and inference engine 202.

Additionally, change in vehicle configuration monitoring agent 206 may monitor telemetry data received via vehicle interface 108 for changes in vehicle hardware configuration, changes in vehicle software configuration, etc. In some embodiments, change in vehicle configuration monitoring agent 206 may implement a filter or threshold-based analysis, wherein changes must be significant enough to satisfy a threshold to trigger an updated deployment plan selection initiation. Likewise, cost function update monitoring agent 204 and weight update monitoring agent 208 may implement a threshold-based analysis to determine whether or not a change in cost function or weightings is significant enough to initiate an updated deployment selection, or whether it would be sufficient to update cost function store 116 and cost function weighting store 118 to include the updated cost functions and weightings for use in future evaluation, without proactively initiating a new updated deployment plan selection. However, assuming the given change is significant to satisfy the respective change thresholds, the cost function update monitoring agent 204, the weight update monitoring agent 208, or the change in vehicle configuration monitoring agent 206 may send a command or other message to updated deployment plan selection initiation module 210, which may cause an updated deployment plan selection process to be performed. For example, updated deployment plan selection initiation module 210, when invoked, may cause deployment plan generation module 112 to generate a set of feasible deployment plans using a latest updated vehicle graph 104 for a given vehicle for which the updated deployment plan is being generated. Also, the deployment plan generation module 112 may use the latest updated software manifest 106 for the given vehicle for which the updated deployment plan is being generated. Additionally, the updated deployment plan selection initiation module 210, when invoked, may cause the cost function evaluator 120 to determine costs for the newly generated feasible deployment plans, wherein the costs are generated using the latest updated cost functions stored in cost function store 116 and the latest updated weightings stored in the cost function weighting store 118. The deployment selection module may then select an updated deployment plan from among the feasible deployment plans based on the newly determined costs. Also, the deployment plan selection module 122 may cause the updated deployment plan to be transmitted to the given vehicle for implementation by the deployment orchestration agent of the given vehicle.

Figure 3:
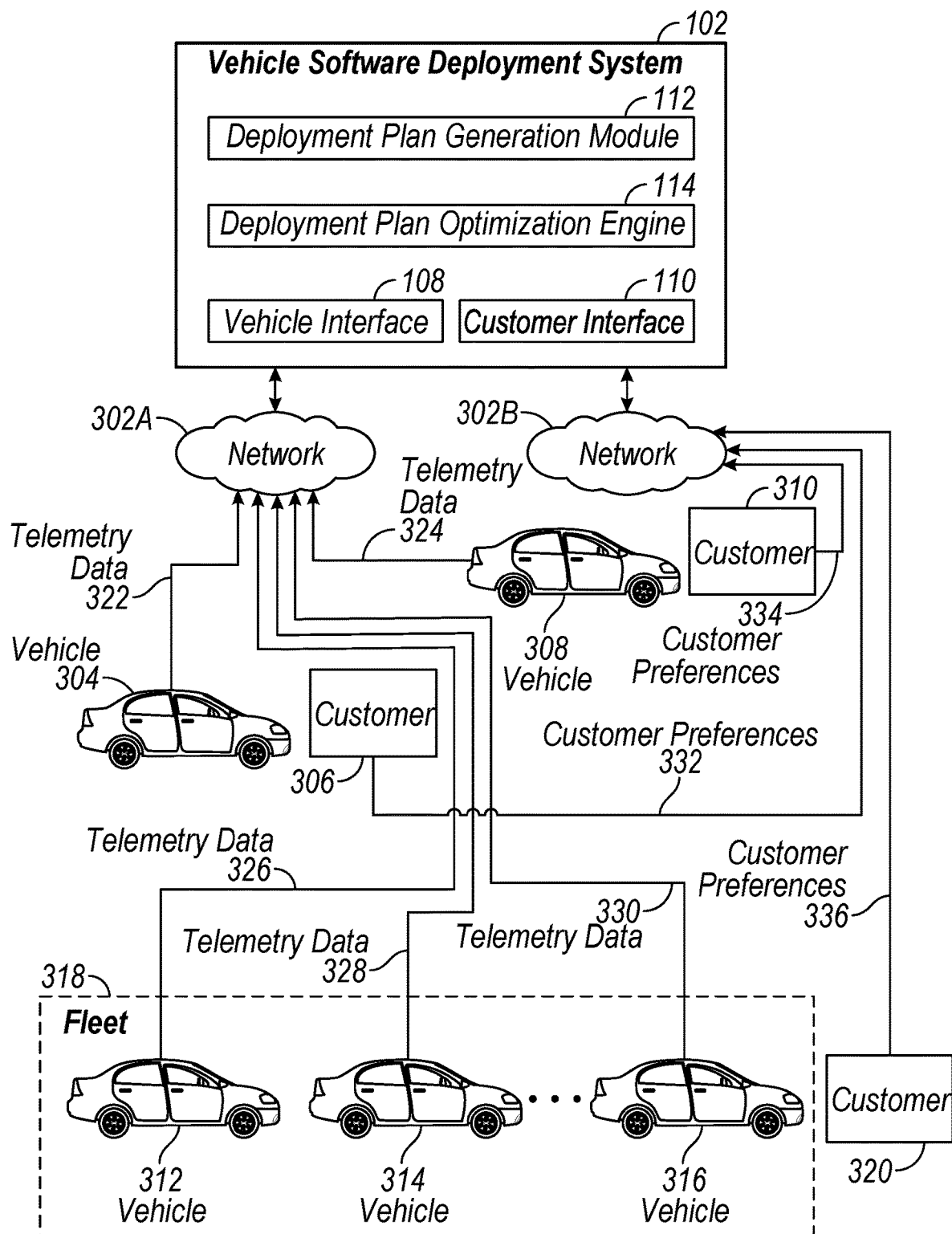
FIG. 3 illustrates a vehicle software deployment system configured to collect telemetry data from vehicles and vehicle-fleets along with customer preferences, wherein the telemetry data and the customer preferences may be used to determine optimized deployment plans for the respective vehicles, according to some embodiments.

FIG. 3 illustrates a vehicle software deployment system configured to collect telemetry data from vehicles and vehicle-fleets along with customer preferences, wherein the telemetry data and the customer preferences may be used to determine optimized deployment plans for the respective vehicles, according to some embodiments.

As discussed above, in some embodiments, a vehicle software deployment system, such as vehicle software deployment system 102, may collect telemetry data from vehicles, wherein the telemetry data indicates a current state of the respective vehicles, such as hardware installed on the respective vehicles and software applications implemented on the respective vehicles. Also, fleet-wide data may be collected from a fleet of vehicles. Likewise, customers may submit customer preferences with regard to costs and weightings for optimized deployment as well as with regard to failure scenarios to be considered in determining fallback deployment plans, as well as application prioritization to be used in fallback deployment plans.

For example, vehicle telemetry data 322 may be received from vehicle 304 via network 302A at vehicle interface 108. In addition, vehicle 308 may provide its own vehicle telemetry data 324 (which may be different than the vehicle telemetry data 322 provided by vehicle 304). The telemetry data 324 from vehicle 308 may also be received via network 302A at vehicle interface 108. Note that in some embodiments, as illustrated in FIG. 3, vehicle telemetry data may be provided and received at a granularity of individual vehicles.

Also, in some embodiments, fleet-wide vehicle data may be collected. For example, vehicle telemetry data 326, 328, and 330 is collected from fleet 318 comprising vehicles 312, 314, and 316. In some embodiments, the vehicle telemetry data 326, 328, and 330 may provide individual vehicle granularity information similar to vehicle telemetry data 322 and vehicle telemetry data 324, but may also include one or more characteristics or metadata that enable a vehicle software deployment system 102 to understand that the respective vehicles (e.g., vehicles 312, 314, and 316) belong to a same fleet (e.g., fleet 318). For example, this may enable fleet-wide data monitoring and inference engine 202 to identify the vehicles as belonging to a fleet and may further allow the fleet-wide data monitoring and inference engine to group the collected telemetry data together into a fleet-wide dataset that can be analyzed to determine fleet-wide inferences. Also, as previously discussed, these fleet-wide inferences may be used to update weightings and/or cost functions used in determining optimized deployments.

In some embodiments, customer preferences may also be received via customer interface 110. As shown in FIG. 3, in some embodiments, customers may provide customer preferences, such as optimization goals, failure scenarios to be considered, application prioritizations, etc. at an individual vehicle level or at a fleet level. For example, customer 306 may provide customer preferences 332 to be used in determining deployment plans for vehicle 304 via network 302B, which are received at customer interface 110. Note that while shown as separate networks, in some embodiments, networks 302A and 302B may be a same network 302. In addition, customer 310 may provide different customer preferences 334 to be used in determining deployment plans for vehicle 308. As another example, customer 320 may provide fleet-wide customer preferences 336 to be used in determining deployment plans for any of vehicles 312, 314 through 316 belonging to fleet 318.

Figure 4:
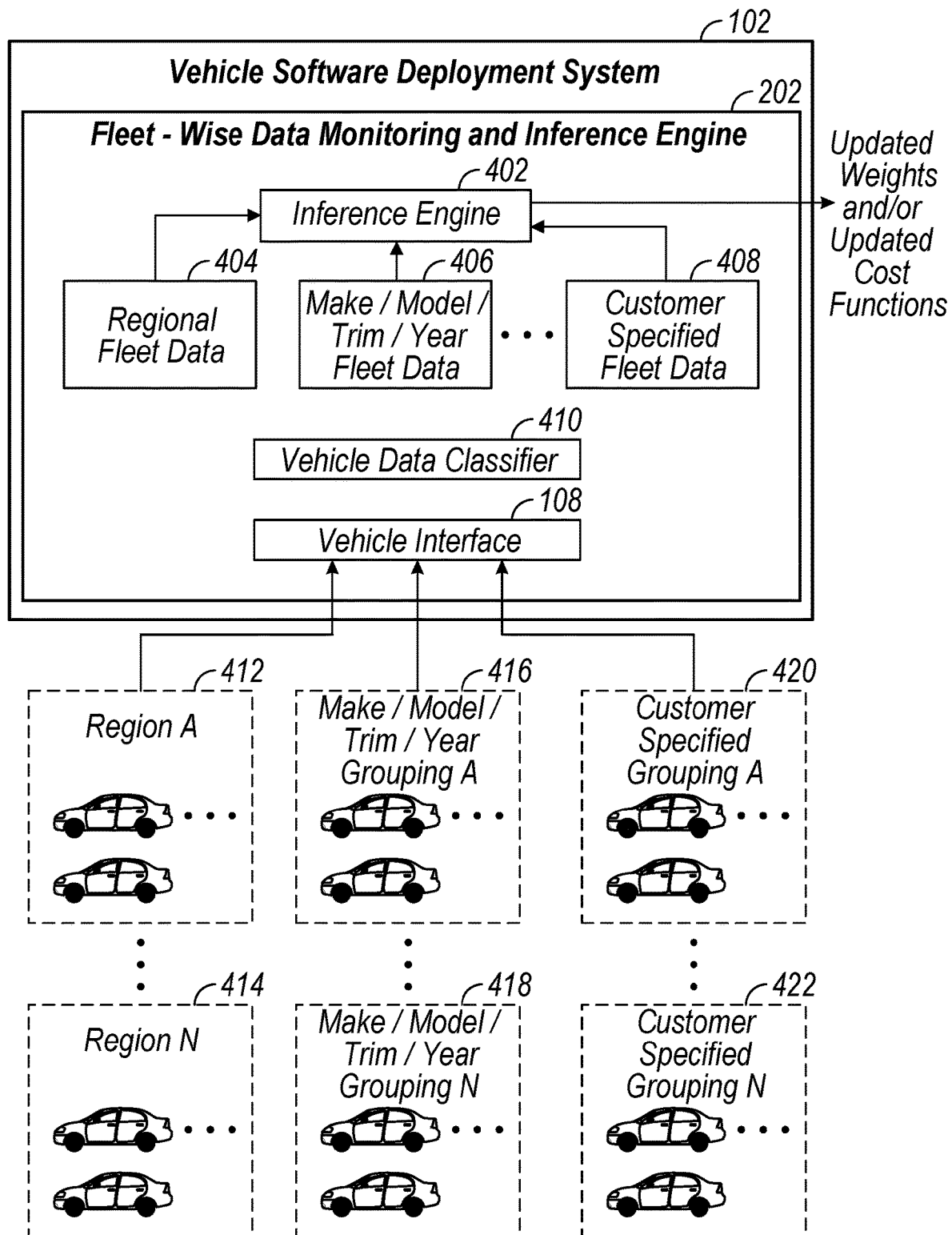
FIG. 4, illustrates a fleet-wide data monitoring and inference engine configured to collect telemetry data from different fleets of vehicles, wherein the fleet-level vehicle data is used to draw inferences about characteristic of the respective fleets, and wherein the inferences are further used to determine weights used in cost functions evaluated to determine optimized deployment configurations for respective ones of the respective vehicles of the fleets, according to some embodiments.

FIG. 4, illustrates a fleet-wide data monitoring and inference engine configured to collect telemetry data from different fleets of vehicles, wherein the fleet-level vehicle data is used to draw inferences about characteristic of the respective fleets, and wherein the inferences are further used to determine weights used in cost functions evaluated to determine optimized deployment configurations for respective ones of the respective vehicles of the fleets, according to some embodiments.

In some embodiments, fleets may be defined in various ways. For example, fleets 412 through 414 may be defined base on geography, wherein vehicles in similar geographic regions are grouped together into respective fleets. For example, vehicles located in the Sunbelt of the United States may be grouped into a fleet, whereas vehicles located in the northeastern United States may be grouped into a separate fleet. In some embodiments, grouping of vehicles into regional fleets may allow a vehicle software deployment system to understand and adjust for regional differences, such as due to different climates, driving conditions, etc.

As another example, fleets 416 through 418 are defined based on one or more of: vehicle make, model, year, trim-level, etc. This may allow a vehicle software deployment system to understand and adjust for vehicle configurations that vary based on these criteria as well as for usage characteristics that vary based on these criteria. For example, vehicle software deployment system 102 may determine inferences to be used to determining weightings for certain makes, models, years, or trim levels, as a few examples.

In some embodiments, customers of a vehicle software deployment system 102 may provide their own customer specified fleet definitions. For example, fleets 420 through 422 may include fleets formed using customer supplied fleet definitions.

As discussed with regard to FIG. 3, vehicles belonging to a fleet may supply fleet characteristic information or other metadata in the telemetry data provided by the vehicles that enables the vehicle software deployment system 102 to determine their membership in one or more respective fleets. Note that a vehicle may belong to more than on fleet. For example, a vehicle located in a given region may belong to a regional fleet, but also belong to a model year fleet, a vehicle make fleet, a vehicle model fleet, a trim-level fleet, and/or one or more customer specified fleets.

In some embodiments, a fleet-wide data monitoring and inference engine, such as fleet-wide data monitoring and inference engine 202, may include a vehicle data classifier that classifies incoming vehicle telemetry data as being telemetry data for a vehicle belonging to one or more fleets. For example, the telemetry data 326, 328, and 330 from vehicles 312, 314, and 316 belonging to fleet 318 may include one or more characteristics (such as GPS location, VIN number, etc.) that enable the respective vehicles to be identified as belonging to fleet 318. In some embodiments, vehicle data classifier 410 may identify such characteristics or metadata included in the telemetry data received at vehicle interface 108, and may route the respective telemetry data to respective fleet data stores, such as regional fleet data store 404 (note that there may be multiple different regional fleet data stores for different respective regions), make, model, trim, and year fleet data stores (which may include various different data stores for different groupings of make, model, year, trim, etc.), and customer-specified fleet data store(s).

Additionally, fleet-wide data monitoring and inference engine 202 may include inference engine 402, which may generate inferences for the fleet-wide data sets and use the generated inferences to determine updated weightings and/or updated cost functions to be used in making optimized deployment decisions. In some embodiments, various data analytical tools and/or statistical tools, as well as machine learning techniques may be used to determine the inferences.

FIG. 5 illustrates an example vehicle software deployment system that further includes a certification verification module configured to ensure software applications requiring certification are certified in a given deployment arrangement corresponding to a selected deployment plan (primary or fallback, optimized or just feasible), according to some embodiments.

In some embodiments, a deployment plan generation module, such as deployment plan generation module 112, may determine feasible deployments, and a vehicle software deployment system 102 may further include a certification verification module 508 configured to determine whether the feasible deployment plans are further required to be certified before being deployed to a given vehicle. Also, the certification verification module 508 may coordinate initiating a certification process for feasible deployment plans that require certification (but that have not yet been certified).

In some embodiments, a deployment plan generation module, such as deployment plan generation module 112, may include a resource availability determination module 502, a input availability determination module 504, and a feasible deployment plan selection/feasible deployment plan generation module 506. For a given vehicle software application to be deployed, the resource availability determination module 502 may determine what resources (e.g., CPU, memory, storage, network bandwidth, etc.) the given application requires. Also, the resource availability determination module 502 may identify placement options (such as respective ECUs) of the vehicle with available un-allocated resource capacity that meet the resource requirements of the given vehicle software application. Additionally, input availability determination module 504 may determine inputs that the given vehicle software application needs to have access to and may further determine placement locations that are included in vehicle domains with access to the required inputs. The feasible deployment plan selection/generation module 506 may then form a deployment plan using the identified available resources and identified locations satisfying the input requirements. In some embodiments, more than one placement location may be feasible, thus more than one feasible deployment plan may be generated. In some embodiments, stored deployment plans may be selected for vehicle software applications for which a deployment plan on the given vehicle has already been generated.

In some embodiments, the deployment plan generation module 112 may provide the determined feasible deployment plans to certification verification module 508, if requiring certification. If not requiring certification, the feasible deployment plans may be provided to deployment plan optimization engine 114 or fallback deployment plan generation engine 126. The certification verification module 508 may ensure the deployment plans requiring certification are certified before being deployed. In some embodiments, certification verification module 508 includes a directory of feasible deployment plans that have already been certified (e.g., certified feasible deployment plans 510). The certification verification module 508 may determine whether a given feasible deployment plan generated by the deployment plan generation module 112 is included in the directory 510 of already certified deployment plans. If so, the feasible deployment plan may be passed on as being certified. Otherwise, certification initiation module 512 may be invoked to cause a certification process to be performed to certify the feasible (but not yet certified) deployment plan. For example, real-world performance testing may need to be performed, or a vehicle software test environment management system 136 (as further described in FIG. 18) may be used to perform testing using a virtual vehicle. The certified feasible deployment plans may then be provided to deployment plan optimization engine 114 and/or fallback deployment plan generation engine 126.

Figure 6:
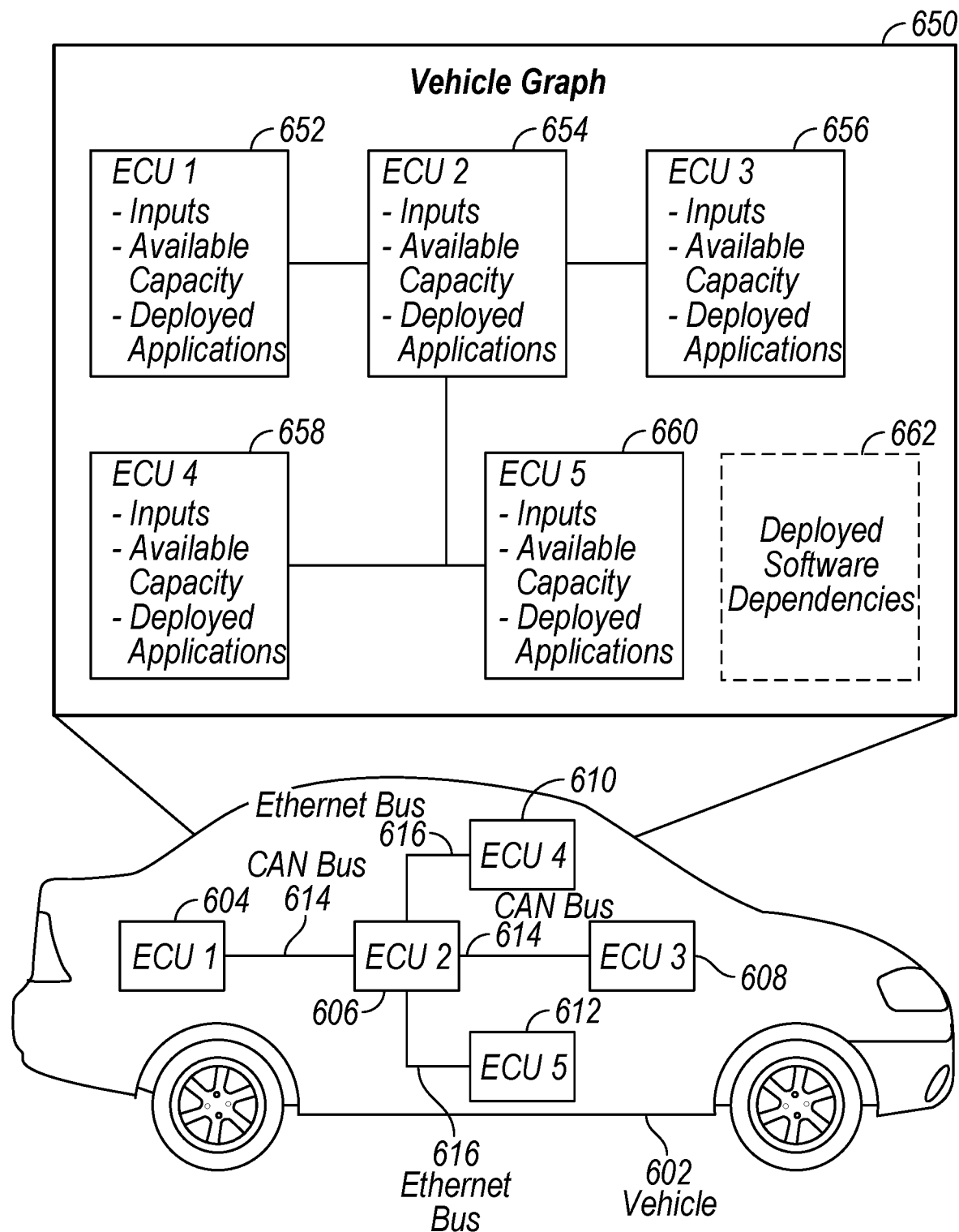
FIG. 6 illustrates a vehicle with a simplified example vehicle bus configuration and ECU configuration and a corresponding vehicle graph representing the bus configuration, ECU configuration and/or software configurations of the vehicle, according to some embodiments.

FIG. 6 illustrates a vehicle with a simplified example vehicle bus configuration and ECU configuration and a corresponding vehicle graph representing the bus configuration, ECU configuration and/or software configurations of the vehicle, according to some embodiments.

In some embodiments, respective ones of the vehicle graphs 104 may include a vehicle graph, such as vehicle graph 650, which corresponds to a vehicle 602. For example, vehicle 602 includes ECU 1 (604), ECU 2 (606) and ECU 3 (608) connected via CAN bus 614. Also, vehicle 602 includes ECU 4 (610), ECU 2 (606) and ECU 5 (612) connected via Ethernet bus 616. Note that a real-world vehicle may include several hundred ECUs and more intricate network topologies. However, it should be understood that vehicle 602 has been simplified for case of explanation, but in some embodiments may include significantly more ECUs and more complicated topologies. Vehicle graph 650 corresponding to vehicle 602 includes nodes 652, 654, 656, 658, 660, and 662 that correspond to ECUs 1 through 5 of vehicle 602. Also, the nodes are connected via edges that represent the network connections between the respective nodes. Additionally, the nodes include ECU information for the respective ECU represented by the node, such as inputs available at the respective ECU, an amount of available capacity at the respective ECU (e.g., CPU, memory, storage, etc.), and a listing of applications already deployed at the respective ECU. In some embodiments, vehicle graph 650 may additionally include information 662 indicating dependencies between deployed software applications.

Figure 7:
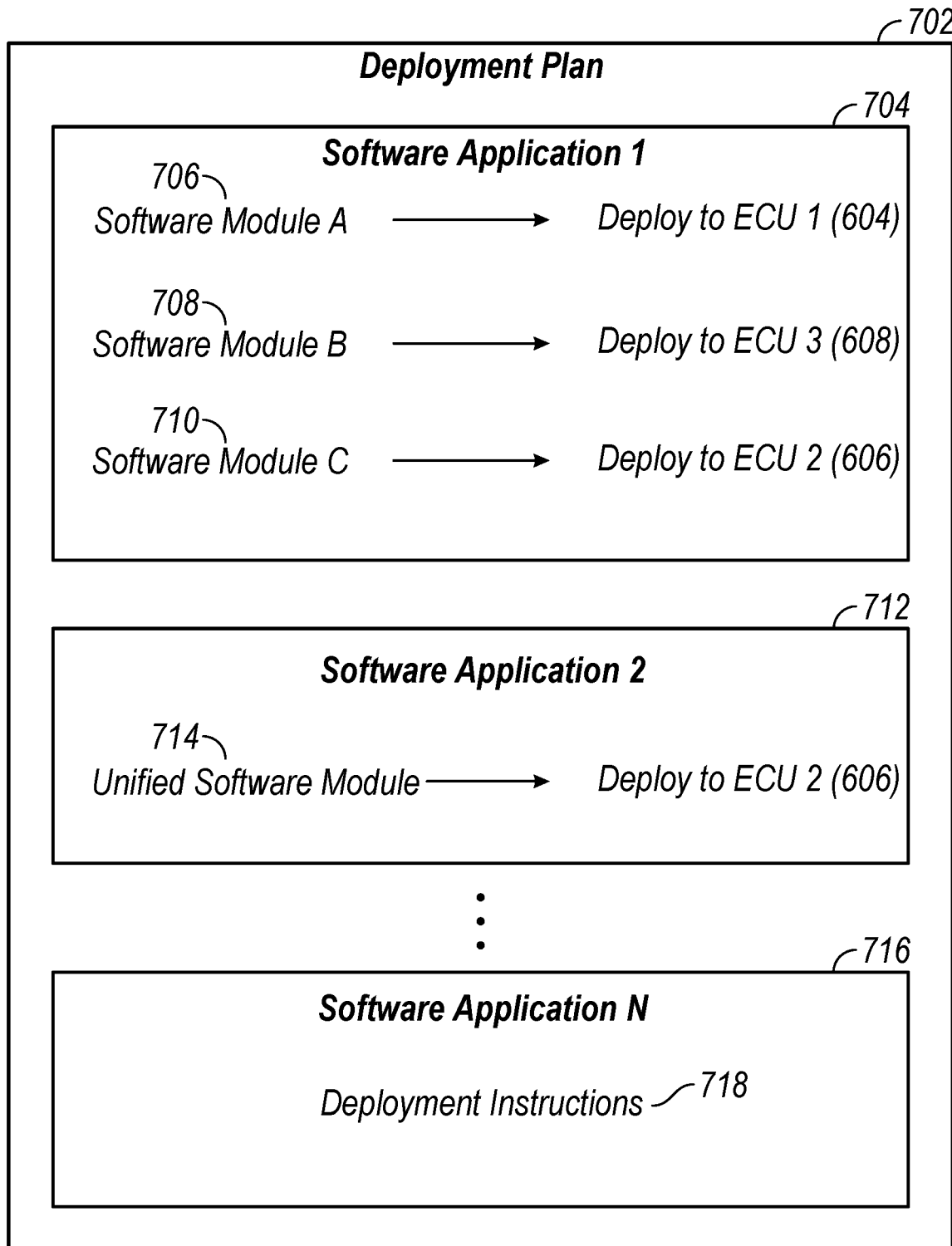
FIG. 7 illustrates a simplified example deployment plan that may be generated by a vehicle software deployment system, according to some embodiments.

FIG. 7 illustrates a simplified example deployment plan that may be generated by a vehicle software deployment system, according to some embodiments.

In some embodiments, a deployment plan may include instructions for use by a vehicle deployment orchestration agent to deploy one or more vehicle software applications. In some embodiments, subsequent deployment plans may supersede previously provided deployment plans. For example, a deployment plan may include a complete listing of deployment instructions (instead of only indicating changes relative to a previously provided deployment plan). In some embodiments, a vehicle software application may be deployed in a modular configuration across two or more ECUs or may be deployed in a unified manner on a single ECU. In some embodiments, other software configurations may be used. As an example, deployment plan 702 includes instructions 704 for placing application 1, wherein module A (706) of application 1 is to be placed on ECU 1 (604), module B of application 1 (708) is to be placed on ECU 3 (608), and module C of application 1 (710) is to be placed on ECU 2 (606). Additionally, deployment plan 702 includes instructions 712 for placing a unified software module (714) for application 2 on ECU 2 (606). Also, deployment plan 702 may include instructions 718 for placing various other software applications, such as software application N 716.

Figure 8:
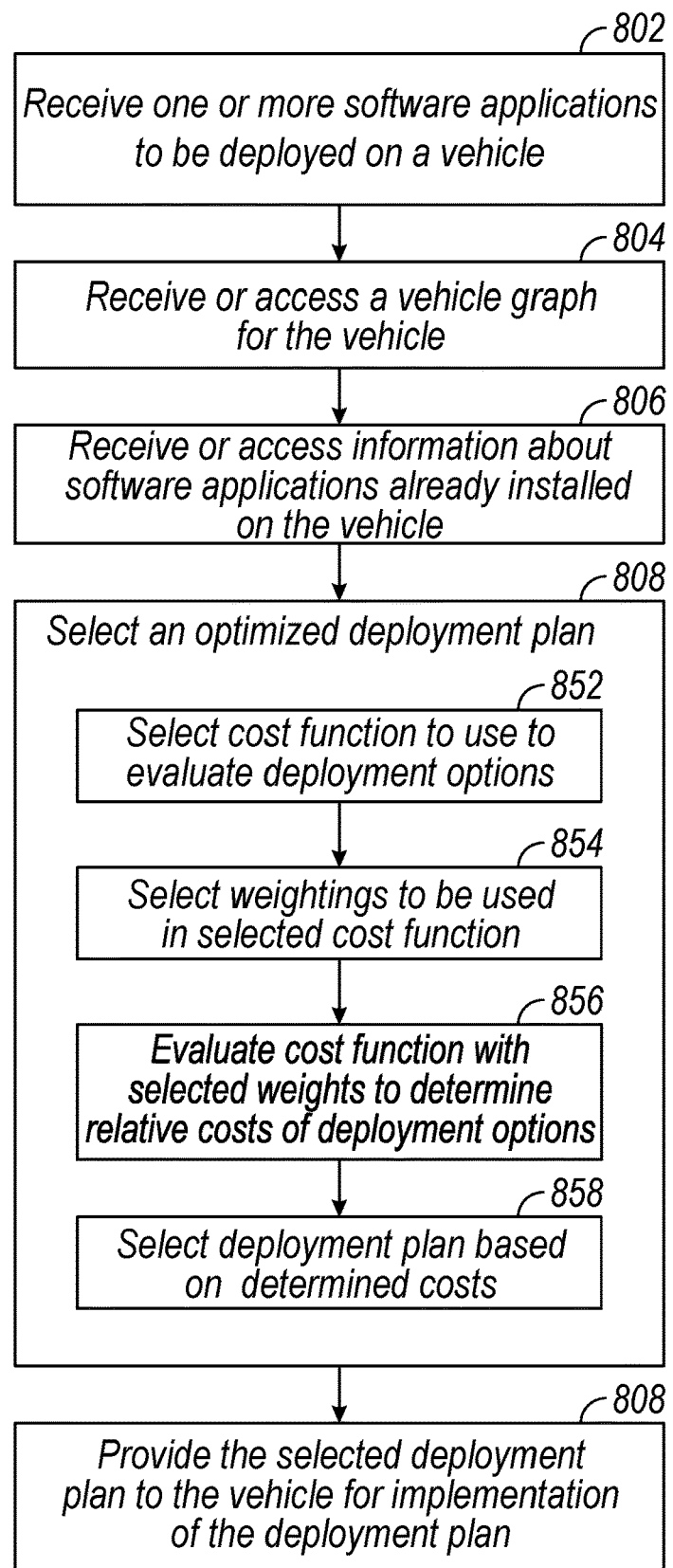
FIG. 8 is a flowchart illustrating a process of generating an optimized deployment plan for one or more software application to be deployed, or already deployed, to a given vehicle having a particular vehicle configuration, according to some embodiments.

FIG. 8 is a flowchart illustrating a process of generating an optimized deployment plan for one or more software application to be deployed, or already deployed, to a given vehicle having a particular vehicle configuration, according to some embodiments.

At block 802, a vehicle software deployment system receives a software application to be deployed on a vehicle. For example, an OEM or part supplier may provide or otherwise indicate a software application to be deployed on a particular vehicle, for example via a customer interface of the vehicle software deployment system. As an example, an owner or operator of the particular vehicle may have purchased an upgrade and the vehicle OEM or part supplier may be supplying the additional software application as part of implementing the upgrade.

At block 804, the vehicle software deployment system receives or access a graph for the vehicle. For example, the vehicle software deployment system may access the graph from a vehicle shadow maintained by a vehicle shadow service, may receive the vehicle graph from the customer (e.g., OEM), or may already have a stored copy of the vehicle graph. In some embodiments, the vehicle software deployment system may update a stored copy of the vehicle graph in order to reflect a current state of the particular vehicle. For example, the vehicle graph may be updated in response to receiving telemetry data indicating changes to hardware or software of the particular vehicle.

At block 806, the vehicle software deployment system receives or access information about software applications already installed on the particular vehicle. In some embodiments, the software information may be included in the graph received at block 804, or may be received or accessed separately. For example, from a database storing software manifests for vehicles or from a vehicle shadow for the particular vehicle.

At block 808, a deployment plan optimization engine of a vehicle software deployment system selects an optimized deployment plan to be used to implement the software application on the particular vehicle. In some embodiments, selecting the optimized deployment plan may further include steps as shown in blocks 852 through 858.

For example, at block 852, a deployment plan optimization engine selects one or more cost functions to be used to evaluate deployment options. The cost functions may be selected from a set of cost functions included in a cost function store of the deployment plan optimization engine. In some embodiments, a customer may provide customer preferences with regard to which costs are important to the customer, and the customer preferences may further be used as a consideration when selecting which cost functions to select to evaluate deployment options.

At block 854, a deployment plan optimization engine selects weightings to be used in the selected cost functions. The weightings may be selected from a set of weightings stored by the deployment plan optimization engine. In some embodiments, customer preferences may be used as a consideration when selecting weightings to be used. Also, inference information from a fleet-wide data monitoring and inference engine may be used when selecting weightings.

At block 856, the deployment plan optimization engine evaluates the selected one or more cost functions using the selected weightings to determine respective costs for the deployment plan options being evaluated.

At block 858, the deployment plan optimization engine selects a given deployment plan from the set of deployment plans being considered based on the determined costs. For example, the lowest cost deployment plan may be selected.

At block 808, the vehicle software deployment system provides the selected deployment plan to be transmitted to the vehicle as an optimized deployment plan. A vehicle deployment orchestration agent may receive the deployment plan and cause the deployment plan to be implemented on the particular vehicle.

Figure 9:
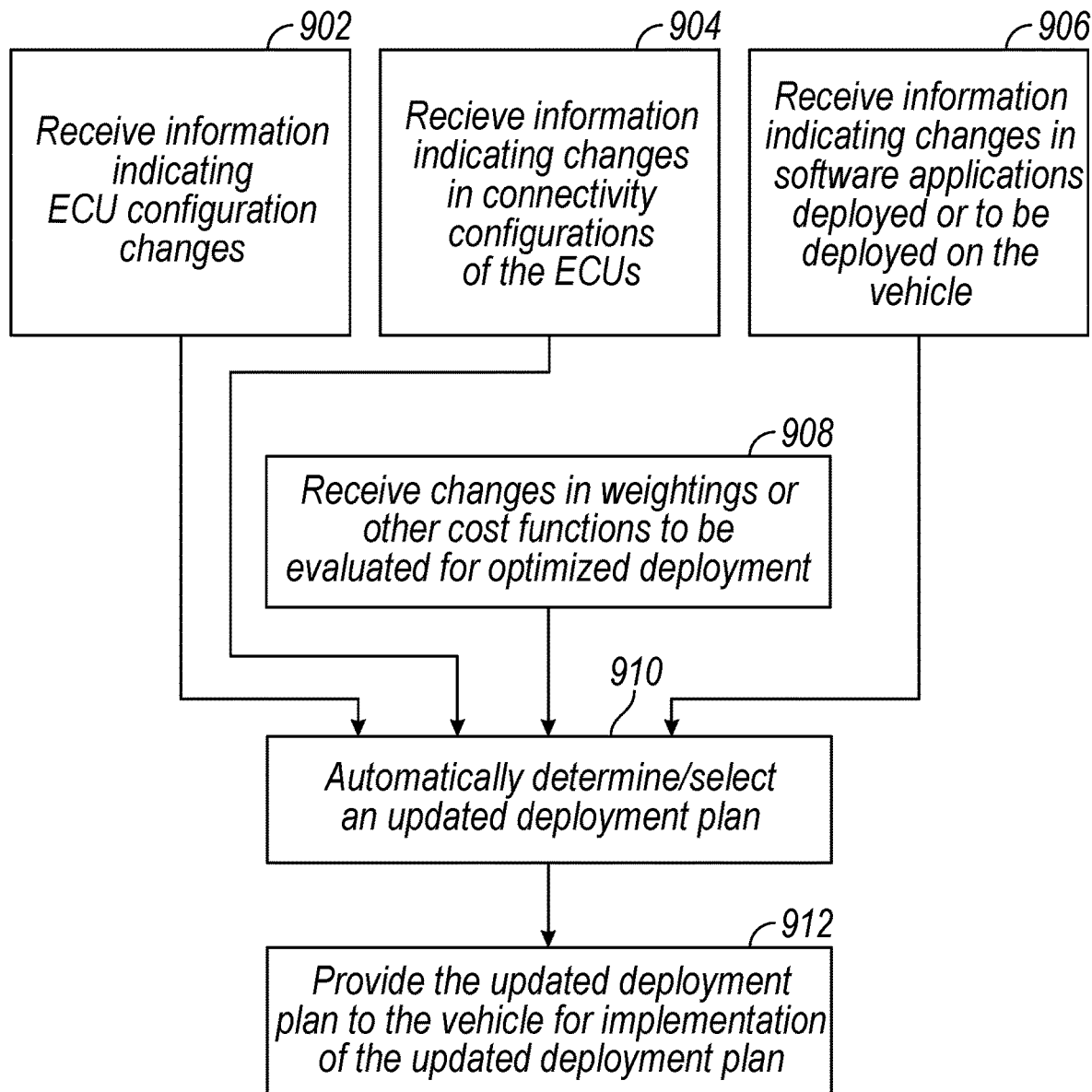
FIG. 9 is a flowchart illustrating an optimization and/or self-healing process that involves receiving updates regarding a vehicle configuration, updates regarding weightings that have been drawn from fleet-level inferences, updates regarding changed cost functions to be used in response to changed customer preferences, etc. and automatically generating an updated deployment plan that is optimized for the changed conditions and/or changed customer preferences, according to some embodiments.

FIG. 9 is a flowchart illustrating an optimization and/or self-healing process that involves receiving updates regarding a vehicle configuration, updates regarding weightings that have been drawn from fleet-level inferences, updates regarding changed cost functions to be used in response to changed customer preferences, etc. and automatically generating an updated deployment plan that is optimized for the changed conditions and/or changed customer preferences, according to some embodiments.

At block 902 a vehicle software deployment system receives information indicating changes in ECU configuration of a vehicle. Also, at block 904, the vehicle software deployment system receives information indicating changes in connectivity configurations of the ECU (e.g. network changes). Additionally, at block 906, the vehicle software deployment system receives information indicating changes in software applications deployed (or to be deployed) to the vehicle. Also, at block 908, the vehicle software deployment system receives changes in weightings or cost functions to be used to evaluate deployment plans.

At block 910, the vehicle software deployment system, in response to the changed conditions (either in the vehicle or with regard to prioritization priorities), automatically determines or selects an updated deployment plan. For example, automatic deployment plan optimization module 124 of deployment plan optimization engine 114 may monitor for such changes and may automatically initiate an updated deployment optimization analysis in response to detecting such changes.

At block 912, the vehicle software deployment system causes the updated deployment plan to be provided to the vehicle to update a deployment configuration of the vehicle. In some embodiments, the vehicle software deployment system may further receive telemetry data back from the vehicles indicating whether or not the provided deployment plan was successfully deployed on a given vehicle to which it was provided. In some embodiments, the vehicle software deployment system may further determine deployment efficiency rates for respective deployment plans and/or software applications included in the deployment plans. In some embodiments, the vehicle software deployment system may provide statistics or other information, such as deployment efficiency rates, back to customers, such as OEM customers or other software suppliers that are providing software to be deployed. In some embodiments, telemetry data received from the vehicles that is used to update a current vehicle graph for the vehicles may additionally be used to determine efficacy of previously distributed deployment plans. In some embodiments, a vehicle software deployment system may determine a provided deployment plan failed to update because software updates are "turned off" for a given vehicle. In such situations, the vehicle software deployment system may generate a message, such as an e-mail, to an entity responsible for the given vehicle to instruct the entity to "turn on" software updates in order to enable a requested software update to proceed. In some embodiments, the vehicle software deployment system may provide such notifications to a customer, such as an OEM, and the customer may provide a notification to a vehicle owner or user to enable software updates to allow a requested software update to proceed.

Figure 10:
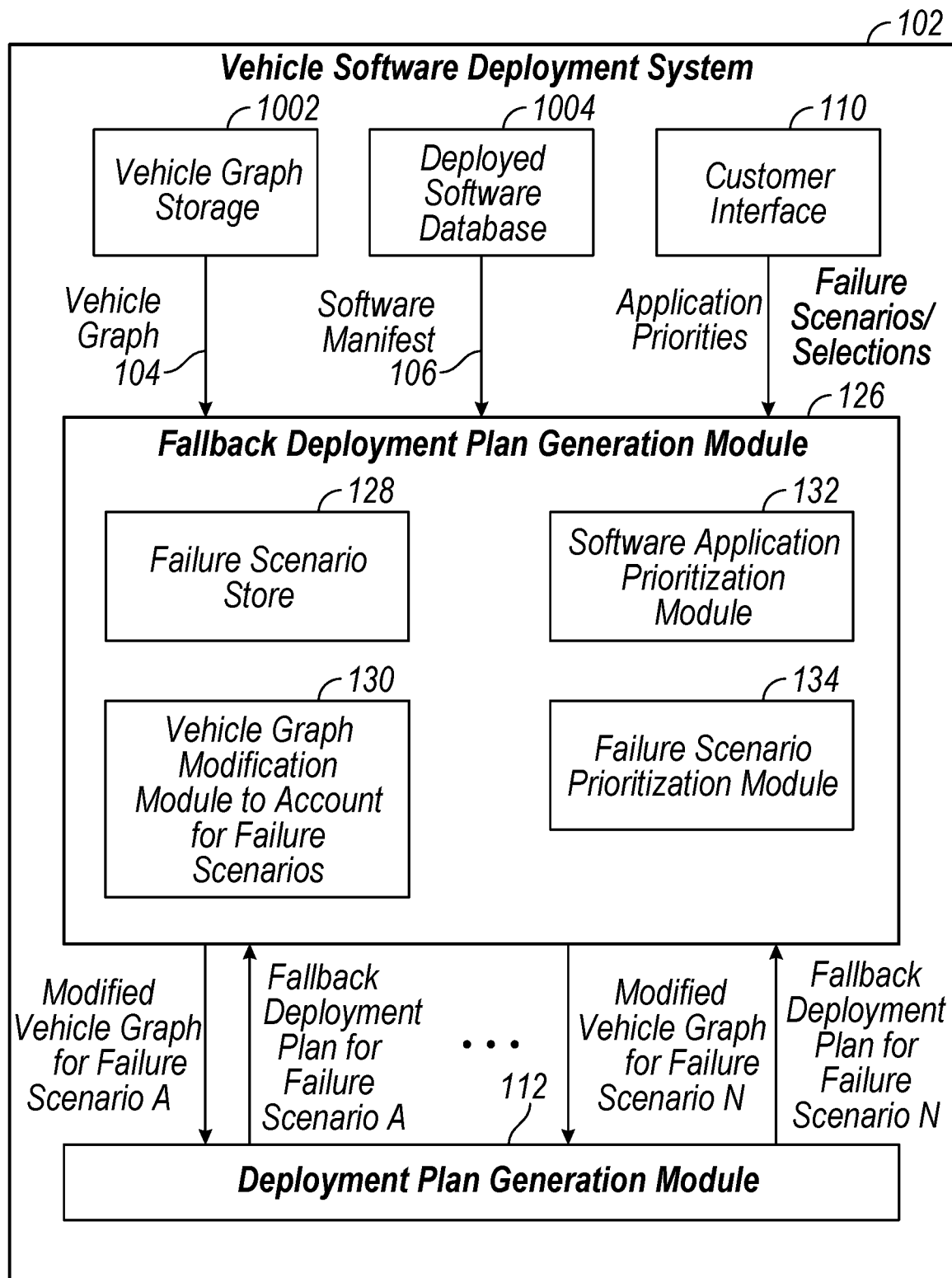
FIG. 10 illustrates interactions between a fallback deployment plan generation module of a vehicle software deployment system and other components of the vehicle software deployment system, according to some embodiments.

FIG. 10 illustrates interactions between a fallback deployment plan generation module of a vehicle software deployment system and other components of the vehicle software deployment system, according to some embodiments.

In some embodiments, fallback deployment plan generation module may receive a vehicle graph 104 from vehicle graph store 1002, receive software manifest 106 from deployed software database 1004 and receive application priorities and/or failure scenarios to be considered from a customer via customer interface 110.

In some embodiments, the failure scenarios to be considered may be stored in failure scenario store 128 and the customer priorities may be provided to software application prioritization module 132 and failure scenario prioritization module 134.

In some embodiments, fallback deployment plan generation module 126 may determine one or more fallback deployment plans to be used in one or more failure scenarios. The fallback deployment plans may be determined ahead of time (e.g., as part of determining an initial deployment bundle) and before a given failure has occurred. In some embodiments, the fallback deployment plans may be pre-certified.

Figure 11:
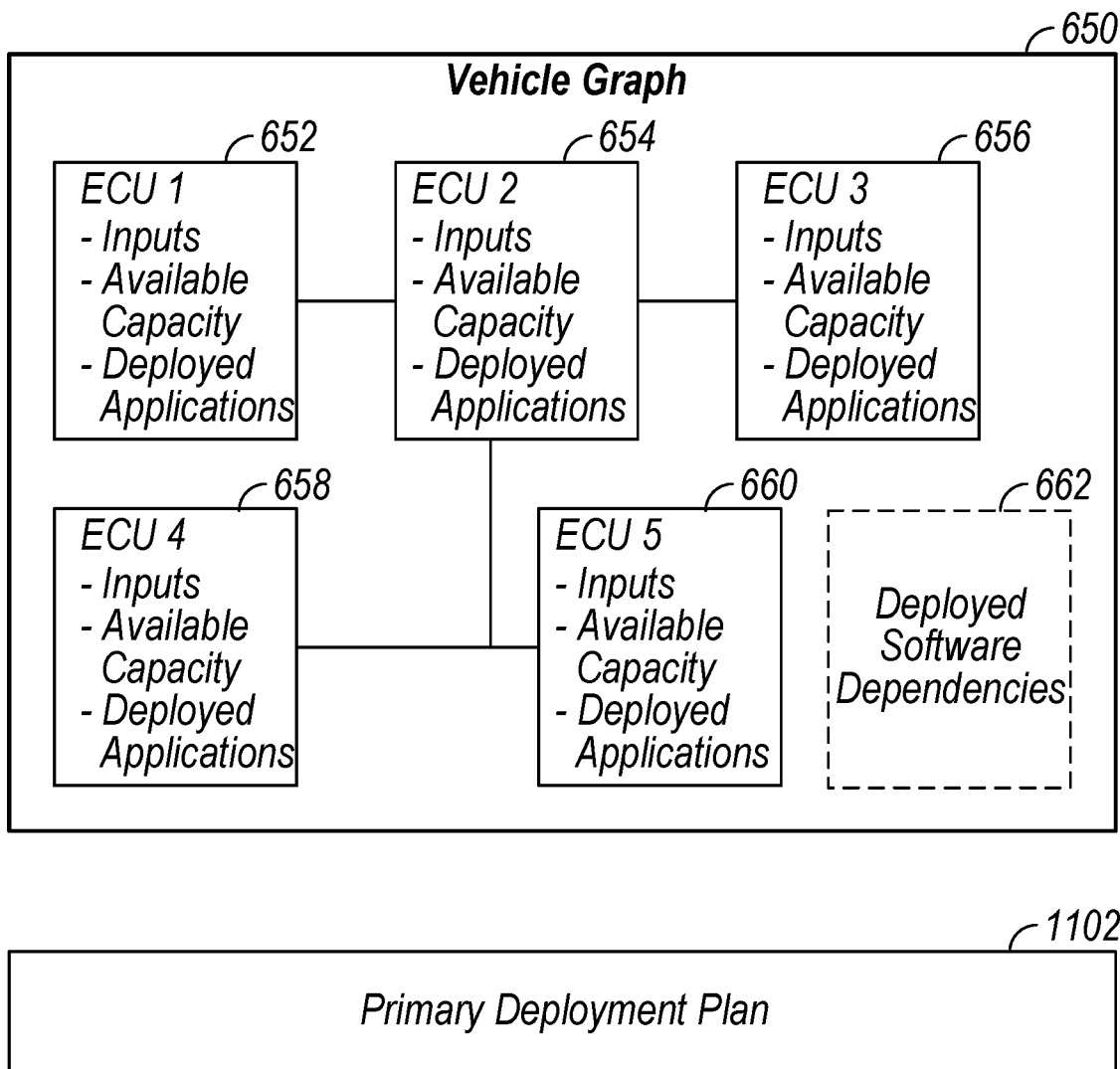
FIG. 11 illustrates an example primary deployment plan and corresponding vehicle graph (assuming no failure scenarios), wherein the primary deployment plan may be included in a deployment plan bundle, according to some embodiments.
Figure 12:
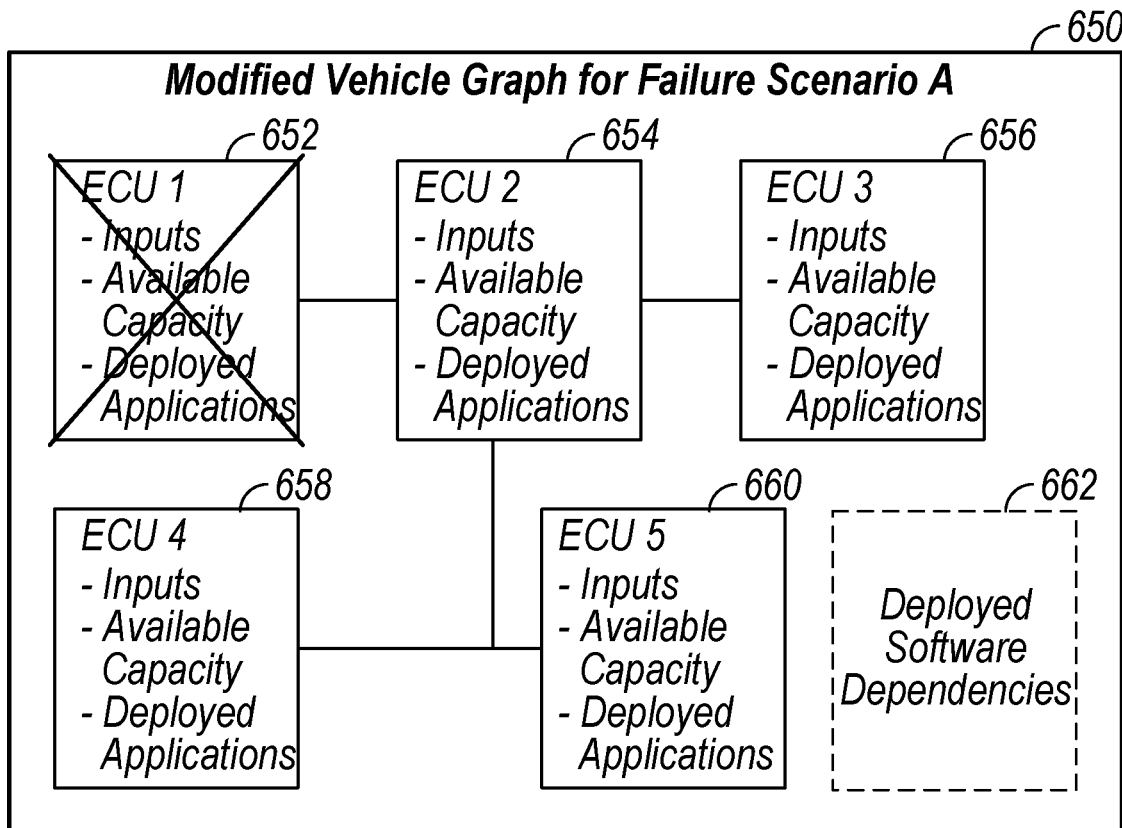
FIG. 12 illustrates an example fallback deployment plan and corresponding vehicle graph (assuming failure scenario A), wherein the fallback deployment plan for failure scenario A may be included in the deployment plan bundle, according to some embodiments.
Figure 12:
Figure 13:
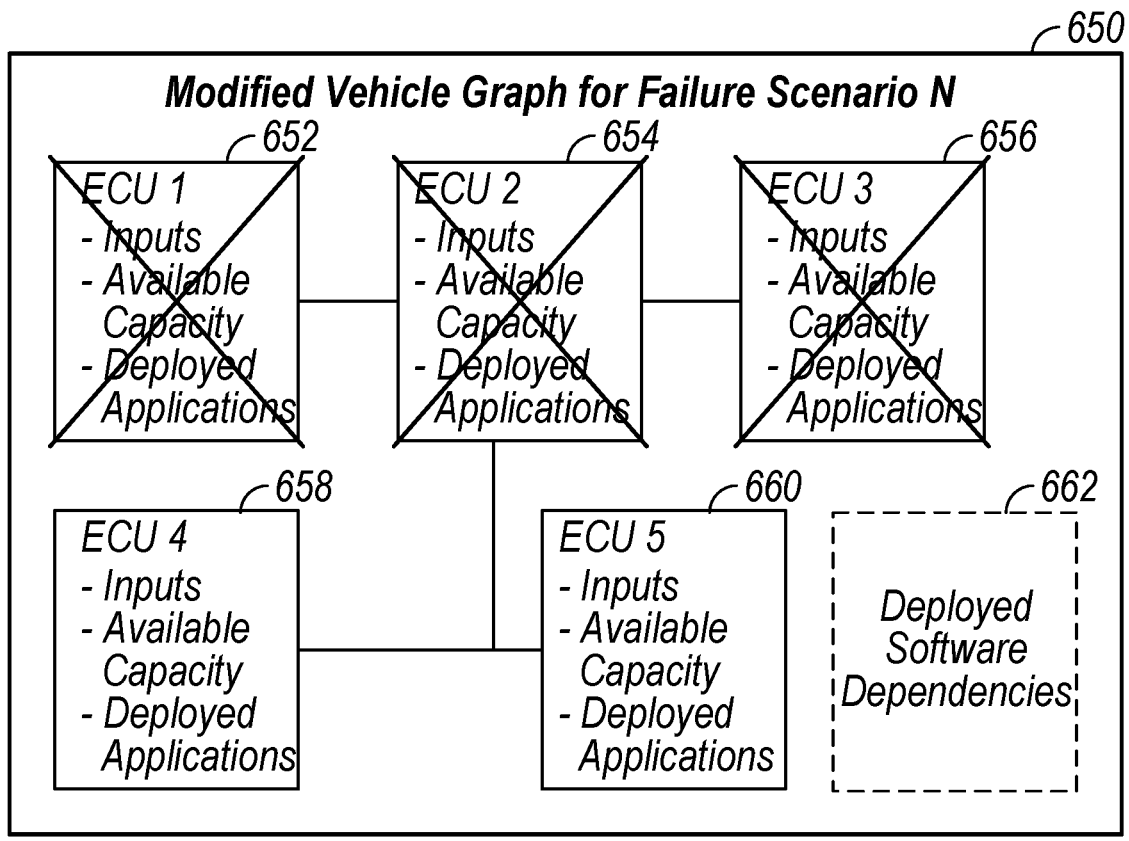
FIG. 13 illustrates another example fallback deployment plan and corresponding vehicle graph (assuming failure scenario N), wherein the fallback deployment plan for failure scenario N may be included in the deployment plan bundle, according to some embodiments.
Figure 13:

In order to determine a fallback deployment plan, the fallback deployment plan generation module 126 may select a failure scenario to be used to determine the fallback deployment plan from failure scenario store 128. In some embodiments, failure scenario prioritization module 134 may select the failure scenario to consider based on customer preferences. Once a failure scenario is selected, a vehicle graph may be modified to reflect the failure scenario. For example, FIG. 11 illustrates a vehicle graph without a failure scenario implemented, whereas FIG. 12 illustrates a vehicle graph with a failure scenario A implemented and FIG. 13 illustrates a vehicle graph with a failure scenario N implemented. As can be seen, implementing the failure scenario may involve removing or otherwise indicating that one or more components are unavailable in the vehicle graph. Additionally, in the case where the failure causes resource capacity to fall below a level sufficient to implement all deployed vehicle software applications, software application prioritization module may determine metadata to be provided with the modified vehicle graph indicating respective priorities of the vehicle software applications.

Figure 14:
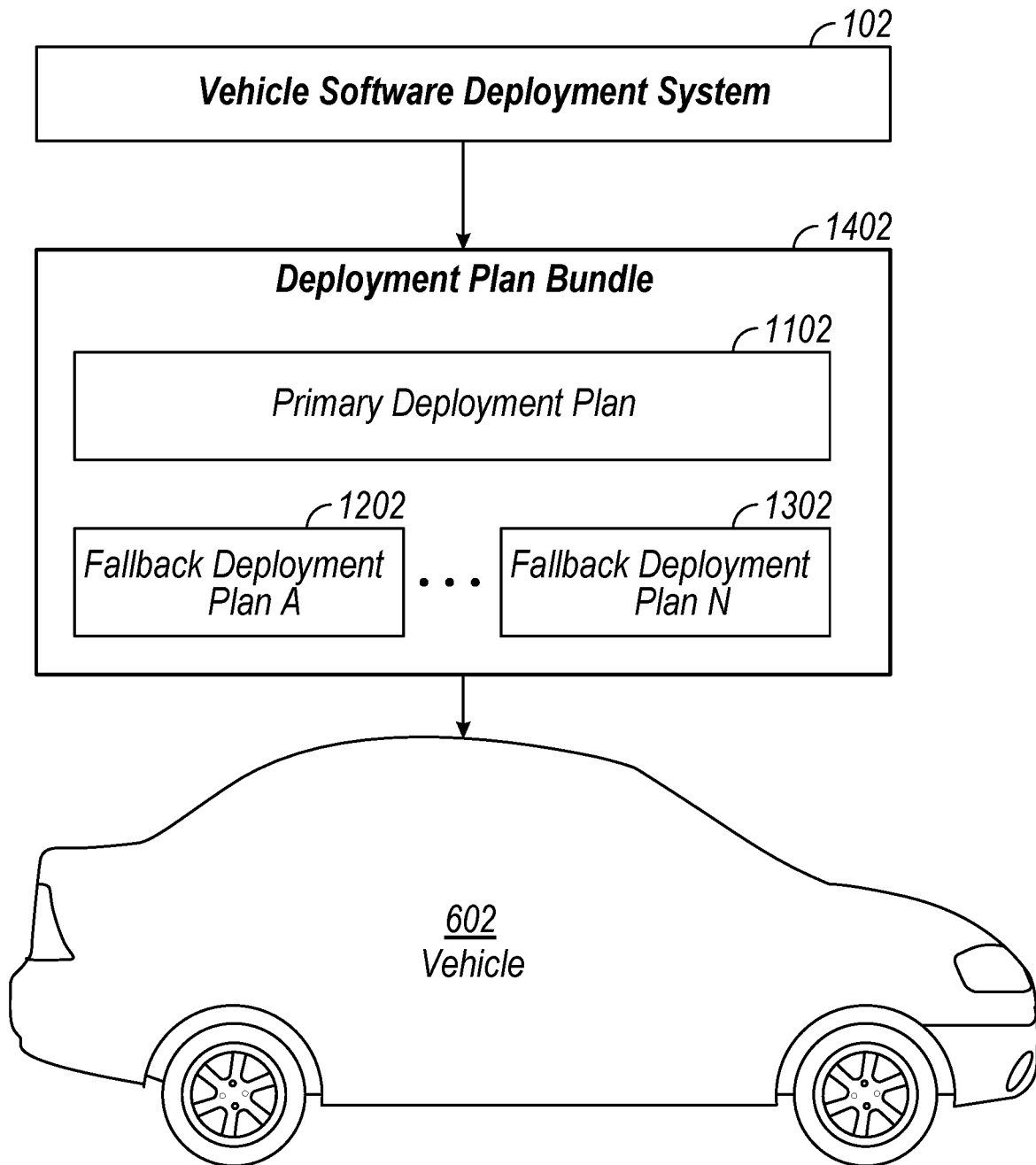
FIG. 14 illustrates a vehicle software deployment system configured to provide a deployment plan bundle comprising a primary deployment plan and fallback deployment plans to a vehicle, according to some embodiments.

The modified vehicle graph and software prioritization information may be provided to deployment generation module 112, which may generate a deployment plan (e.g., fallback deployment plan) for the corresponding failure scenario being considered. This process may be repeated for any number of failure scenarios to be considered and for which fallback deployment plans are to be generated. In some embodiments, the vehicle software deployment system 102 may further ensure certification requirements are met for the fallback deployment plans using a certification verification module 508 as shown in FIG. 5. In some embodiments, a primary deployment plan and one or more fallback deployment plans may be included in a deployment bundle, for example as shown in FIG. 14.

FIG. 11 illustrates an example primary deployment plan 1102 and corresponding vehicle graph (assuming no failure scenarios), wherein the primary deployment plan may be included in a deployment plan bundle, according to some embodiments.

FIG. 12 illustrates an example fallback deployment plan 1202 and corresponding vehicle graph (assuming failure scenario A), wherein the fallback deployment plan for failure scenario A may be included in the deployment plan bundle, according to some embodiments.

FIG. 13 illustrates another example fallback deployment plan 1302 and corresponding vehicle graph (assuming failure scenario N), wherein the fallback deployment plan for failure scenario N may be included in the deployment plan bundle, according to some embodiments.

FIG. 14 illustrates a vehicle software deployment system configured to provide a deployment plan bundle comprising a primary deployment plan and fallback deployment plans to a vehicle, according to some embodiments. As discussed above, a deployment plan bundle, such as deployment plan bundle 1402, may include a primary deployment plan 1102 and one or more fallback deployment plans, such as fallback deployment plans 1202 and 1302 that correspond to the failure scenarios shown in FIGS. 12 and 13.

Figure 15:
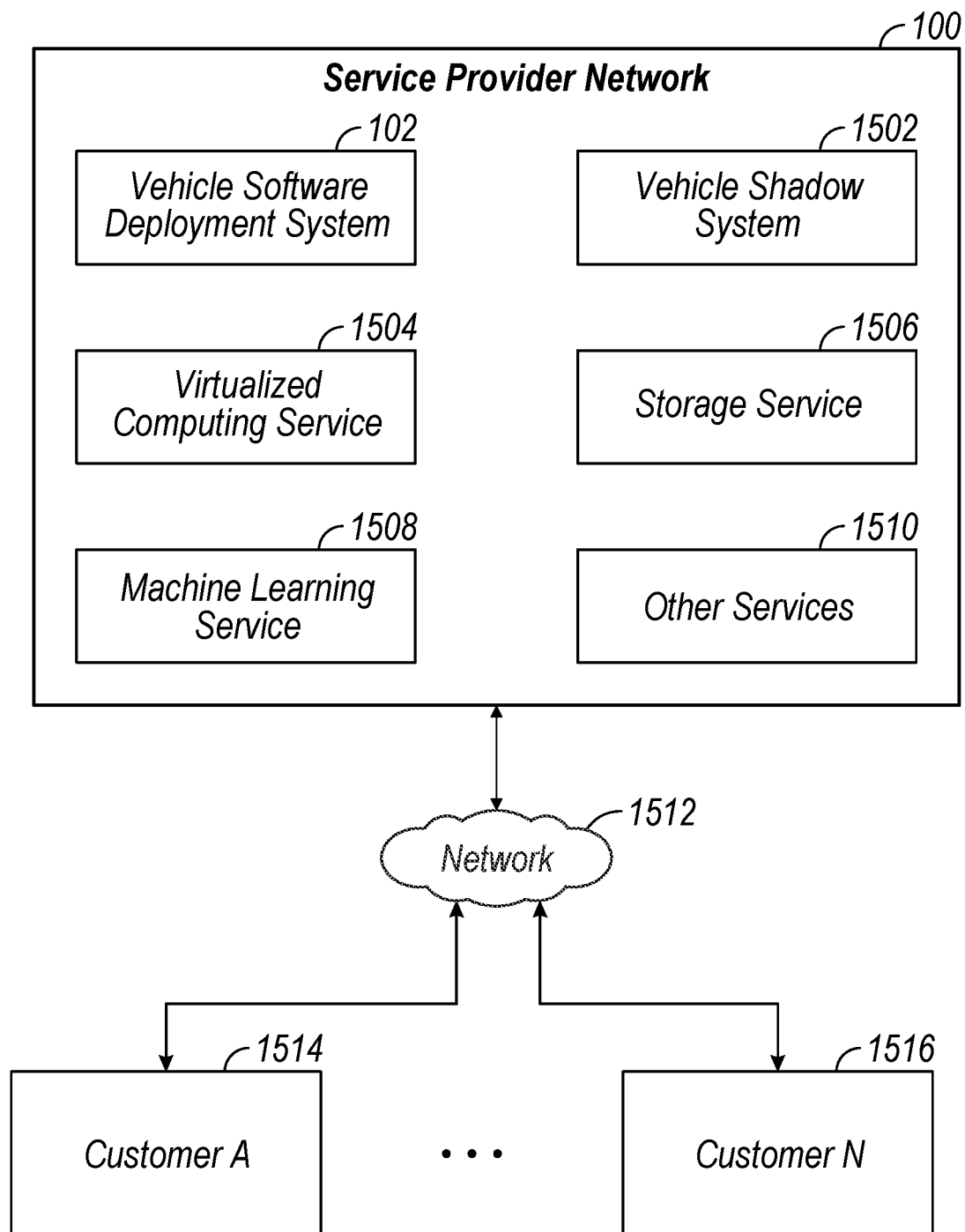
FIG. 15 illustrates additional services that may be included in a service provider network along with a vehicle software deployment system, according to some embodiments.

FIG. 15 illustrates additional services that may be included in a service provider network along with a vehicle software deployment system, according to some embodiments.

In some embodiments, service provider network 100 may include other services in addition to the vehicle software deployment system 102. For example, service provider network 100 may include vehicle shadow system 1502, virtualize computing service 1504, storage service 1506, machine learning service 1508, and other services 1510. In some embodiments, services of the service provider network, such as virtualized computing service and storage service may be used to implement the vehicle software deployment system 102. As another example, machine learning service 1508 may be used to generate inferences on fleet-wide data. In some embodiments, customers, such as customers 1514 and 1516 may interact with service provider network 102 via one or more network, such as network 1512, which may be a public or private network.

Figure 16:
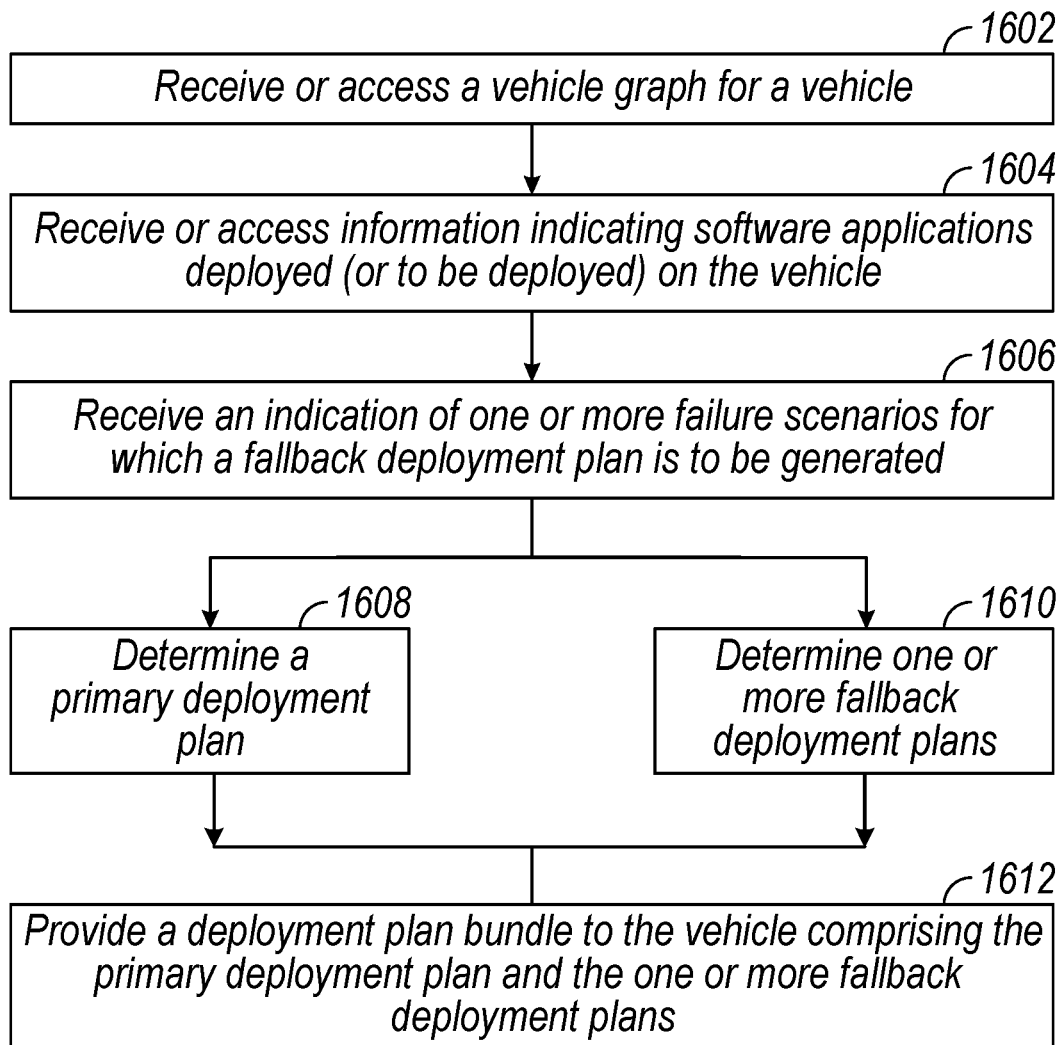
FIG. 16 is a flowchart illustrating a process for generating and providing a deployment plan bundle to a vehicle, wherein the deployment plan bundle includes a primary deployment plan and one or more fallback deployment plans for one or more failure scenarios, according to some embodiments.

FIG. 16 is a flowchart illustrating a process for generating and providing a deployment plan bundle to a vehicle, wherein the deployment plan bundle includes a primary deployment plan and one or more fallback deployment plans for one or more failure scenarios, according to some embodiments.

At block 1602, a vehicle software deployment system receives or accesses a vehicle graph for a vehicle. Also, at block 1604, the vehicle software deployment system receives or accesses information indicating software applications deployed (or to be deployed) on the vehicle. Additionally, at block 1606, the vehicle software deployment system receives an indication of one or more failure scenarios for which a fallback deployment plan is to be generated.

At block 1608, a deployment plan generation module and/or deployment plan optimization engine determines a primary deployment plan. Also, at block 1610 the deployment plan generation module and a fallback deployment plan generation engine determine or more fallback deployment plans corresponding to the failure scenarios to be considered.

At block 1612, the vehicle software deployment system provides a deployment plan bundle comprising the determined primary deployment plan and the one or more determined fallback deployment plans.

Figure 17:
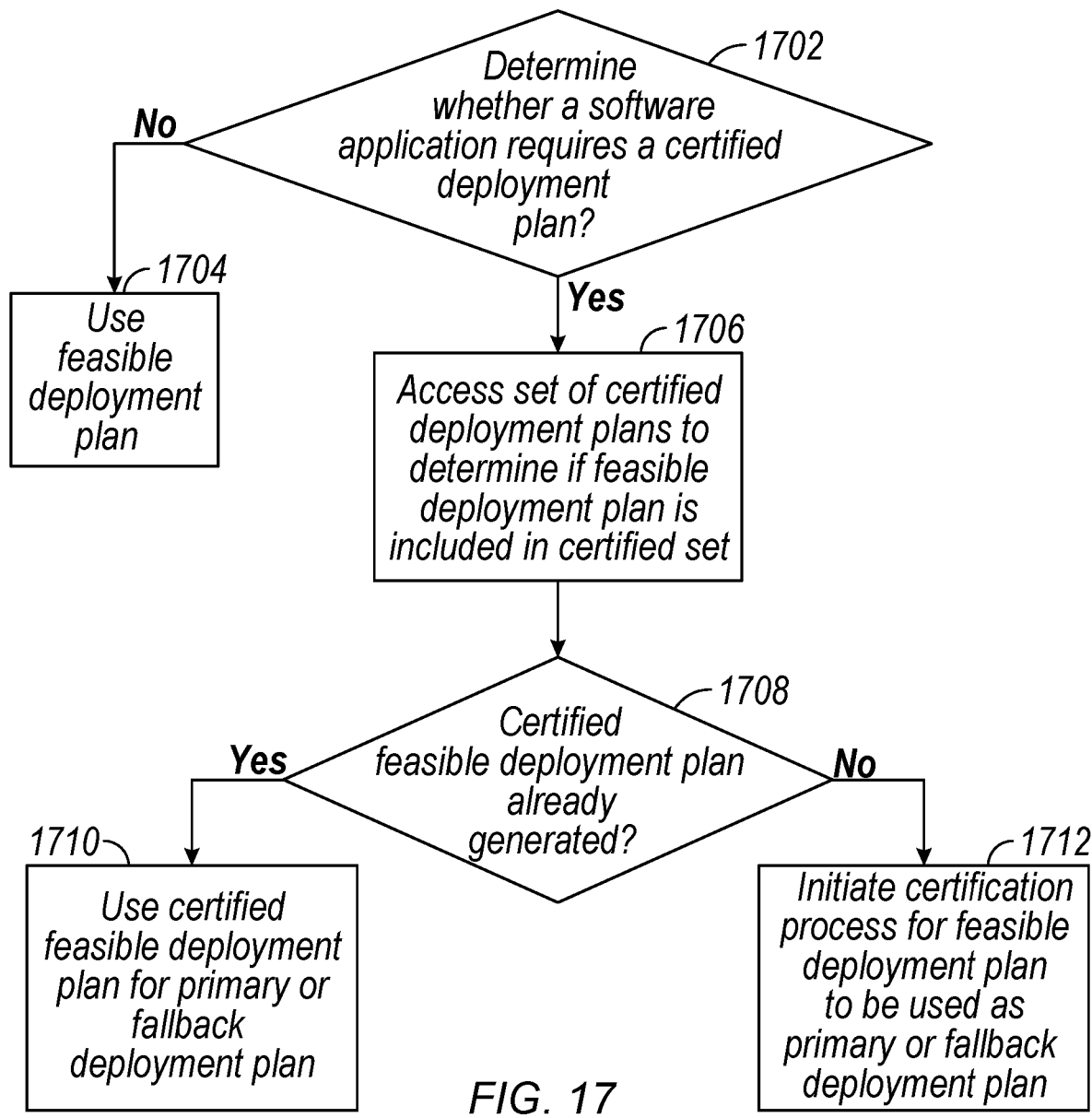
FIG. 17 is a flowchart illustrating a process of selecting primary or fallback deployment plans, such that software certification requirements are met, according to some embodiments.

FIG. 17 is a flowchart illustrating a process of selecting primary or fallback deployment plans, such that software certification requirements are met, according to some embodiments.

At block 1702, a vehicle software deployment system determines whether or not a software application included in a given fallback deployment plan requires certification. If not, at block 1704 any feasible fallback deployment plan may be used without worrying about certification. However, if certification is required, at block 1706 a certification verification module access a set of certified deployment plans to see if there is a suitable fallback deployment plan for the failure scenario that has already been certified. If so, at block 1710 the already generated and certified fallback deployment plan is selected. If not, at block 1712, a certification process is initiated to certify a selected feasible deployment plan that has not yet been certified.

Figure 18:
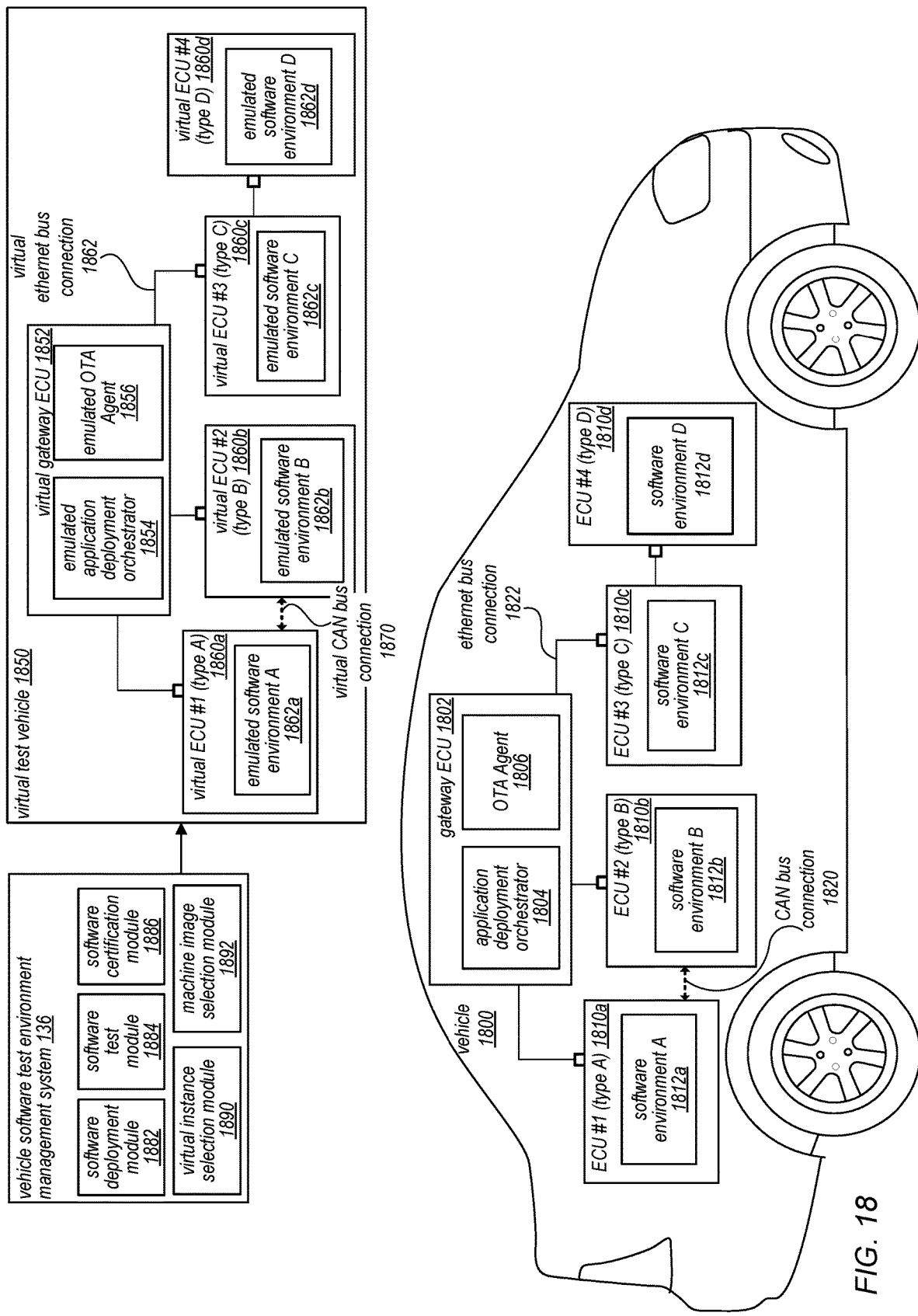
FIG. 18 illustrates additional components that may be included in a vehicle software test environment system, as well as a virtual vehicle used for testing, according to some embodiments.

FIG. 18 illustrates additional components that may be included in a vehicle software test environment system, as well as a virtual vehicle used for testing, according to some embodiments.

In some embodiments, a vehicle software test environment management system 136 may include a software deployment module 1882, a software test module 1884, a software certification module 1886, a virtual instance selection module 1890, and a machine image selection module 1892. The vehicle software test environment management system 136 may provide instructions for implementing (or orchestrates the implementation of) a virtual test vehicle comprising virtual vECUs, wherein the vECUs simulate ECUs of a real-world vehicle. For example, the vehicle software test environment management system 136 may provide instructions for implementing a virtual test vehicle 1850 including virtual vECUs #1-4 1860a-1860d, and a virtual gateway ECU 1852 that simulate respective ones of the ECUs #1-4 1810a-1810d and the gateway ECU 1802 of the vehicle 1800. The virtual vECUs #1-4 1860a-1860d may implement emulated software environments A-D 1862a-1862d that emulate the software environments A-D 1812a-1812d. The virtual instance selection module 1890 may provide instructions to provision the vECUs #1-4 1860a-1860d and the virtual gateway ECU 1852 on respective virtual compute instances. The machine image selection module 1892 may provide instructions to implement machine images to further implement emulated software environments of the various vECUs of the virtual test vehicle 1850 (e.g., emulated software environments A-D 1862a-1862d, emulated application deployment orchestrator 1854, and emulated OTA agent 1856) on respective ones of the virtual compute instances that the vECUs are implemented on.

Example Computer System

Figure 19:
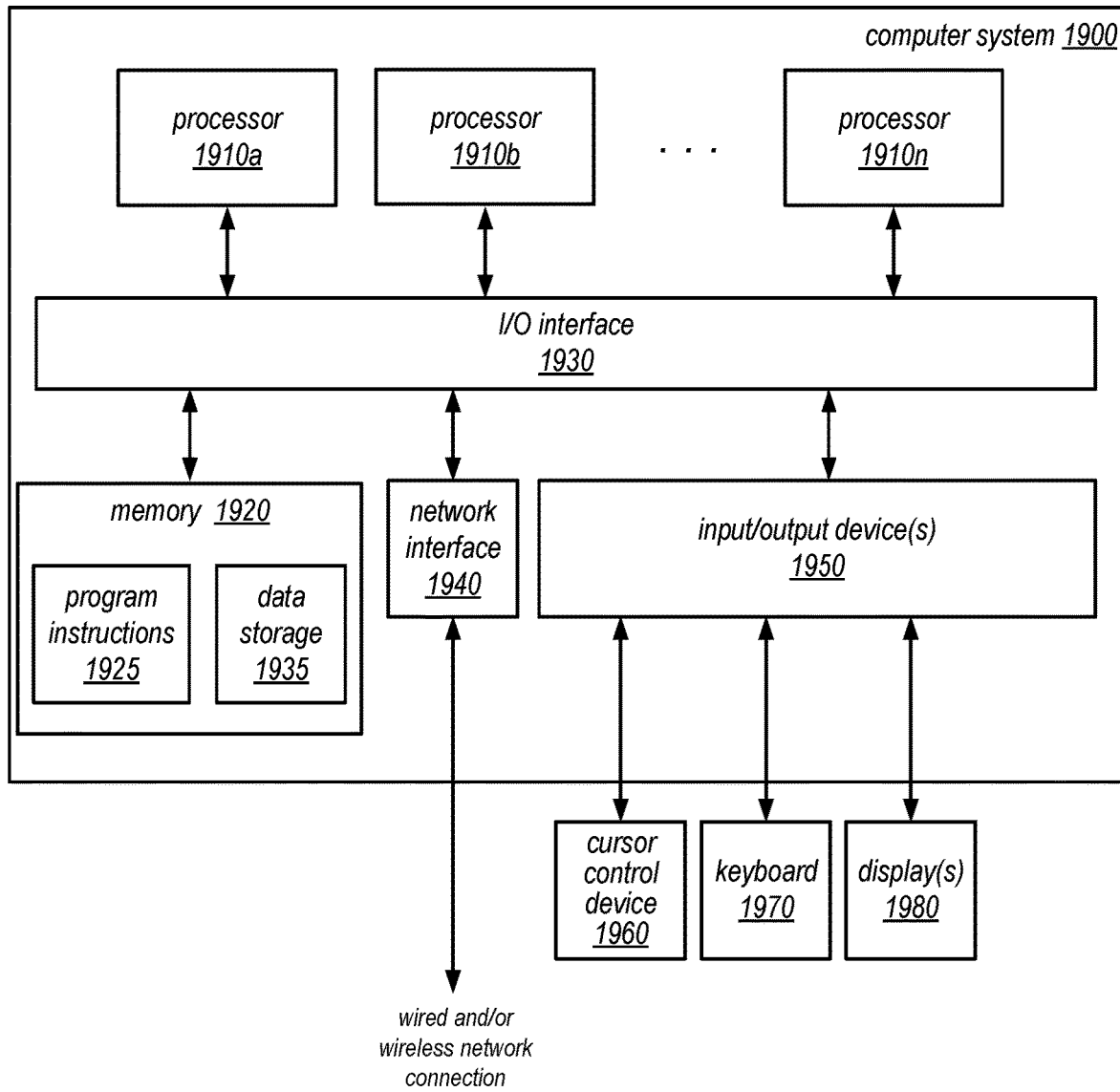
FIG. 19 illustrates a block diagram illustrating an example computer system that implements some or all of the techniques described herein, according to some embodiments.

Any of various computer systems may be configured to implement processes associated with a vehicle software deployment system and/or a vehicle software test environment management system or any other component of the above figures. For example, FIG. 19 illustrates a block diagram illustrating an example computer system that implements some or all of the techniques described herein, according to some embodiments. In various embodiments, the vehicle software deployment system, vehicle software test environment management system, the provider network and other cloud services, the operating system in a vehicle or device, or any other component of the above figures FIGS. 1-18 may each include one or more computer systems 1900 such as that illustrated in FIG. 19.

In the illustrated embodiment, computer system 1900 includes one or more processors 1910 coupled to a system memory 1920 via an input/output (I/O) interface 1930. Computer system 1900 further includes a network interface 1940 coupled to I/O interface 1930. In some embodiments, computer system 1900 may be illustrative of servers implementing enterprise logic or that provide a downloadable application, while in other embodiments servers may include more, fewer, or different elements than computer system 1900.

In various embodiments, computing device 1900 may be a uniprocessor system including one processor or a multiprocessor system including several processors 1910a-1910n (e.g., two, four, eight, or another suitable number). Processors 1910a-1910n may include any suitable processors capable of executing instructions. For example, in various embodiments, processors 1910*a*-1910*n* may be processors implementing any of a variety of instruction set formats (ISAs), such as the x86, PowerPC, SPARC, or MIPS ISAs, or any other suitable ISA. In some embodiments, processors 1910*a*-1910*n* may include specialized processors such as graphics processing units (GPUs), application specific integrated circuits (ASICs), etc. In multiprocessor systems, each of processors 1910*a*-1910*n* may commonly, but not necessarily, implement the same ISA.

System memory 1920 may be configured to store program instructions and data accessible by processor(s) 1910*a*-1910*n*. In various embodiments, system memory 1920 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1920 as code (e.g., program instructions) 1925 and data storage 1935.

In one embodiment, I/O interface 1930 may be configured to coordinate I/O traffic between processors 1910*a*-1910*n*, system memory 1920, and any peripheral devices in the device, including network interface 1940 or other peripheral interfaces. In some embodiments, I/O interface 1930 may perform any necessary protocol, timing, or other data transformations to convert data signals from one component (e.g., system memory 1920) into a format suitable for use by another component (e.g., processor 1910). In some embodiments, I/O interface 1930 may include support for devices attached through various types of peripheral buses, such as a variant of the Peripheral Component Interconnect (PCI) bus standard or the Universal Serial Bus (USB) standard, for example. In some embodiments, I/O interface 1930 may include support for devices attached via an automotive CAN bus, etc. In some embodiments, the function of I/O interface 1930 may be split into two or more separate components, such as a north bridge and a south bridge, for example. Also, in some embodiments, some or all of the functionality of I/O interface 1930, such as an interface to system memory 1920, may be incorporated directly into processors 1910*a*-1910*n*.

In some embodiments, the network interface 1940 may be coupled to I/O interface 1930, and one or more input/output devices 1950, such as cursor control device 1960, keyboard (or touch interface) 1970, and display(s) 1980. In some cases, it is contemplated that embodiments may be implemented using a single instance of computer system 1900, while in other embodiments multiple such computer systems, or multiple nodes making up computer system 1900, may be configured to host different portions or instances program instructions as described above for various embodiments. For example, in one embodiment some elements of the program instructions may be implemented via one or more nodes of computer system 1900 that are distinct from those nodes implementing other elements.

Network interface 1940 may be configured to allow data to be exchanged between computing device 1900 and other devices associated with a network or networks. In various embodiments, network interface 1940 may support communication via any suitable wired or wireless general data networks, such as types of ethernet networks, cellular networks, Bluetooth networks, Wi-Fi networks, Ultra-wideband Networks, for example. Additionally, network interface 1940 may support communication via telecommunications/telephony networks such as analog voice networks or digital fiber communications networks, via storage area networks such as Fibre Channel SANs, or via any other suitable type of network and/or protocol.

In some embodiments, system memory 1920 may be one embodiment of a computer-readable (e.g., computer-accessible) medium configured to store program instructions and data as described above for implementing embodiments of the corresponding methods, systems, and apparatus. However, in other embodiments, program instructions and/or data may be received, sent, or stored upon different types of computer-readable media. Generally speaking, a computer-readable medium may include non-transitory storage media or memory media such as magnetic or optical media, e.g., disk or DVD/CD coupled to computing device 1900 via I/O interface 1930. One or more non-transitory computer-readable storage media may also include any volatile or nonvolatile media such as RAM (e.g., SDRAM, DDR SDRAM, RDRAM, SRAM, etc.), ROM, etc., that may be included in some embodiments, of computing device 1900 as system memory 1920 or another type of memory. Further, a computer-readable medium may include transmission media or signals such as electrical, electromagnetic, or digital signals, conveyed via a communication medium such as a network and/or a wireless link, such as may be implemented via network interface 1940. Portions or all of multiple computing devices such as that illustrated in FIG. 19 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device" and "ECU" as used herein, refers to at least all these types of devices, and is not limited to these types of devices.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or nonvolatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
one or more computing devices configured to implement a vehicle software deployment system configured to:
receive or access a vehicle graph of a given vehicle, wherein the vehicle graph indicates respective configurations of one or more electronic control units (ECUs) of the given vehicle and a connectivity configuration of the ECUs of the given vehicle;
receive or access information indicating software applications deployed, or to be deployed, on the given vehicle;
receive, access, or determine one or more failure scenarios for the given vehicle;
determine a primary deployment plan for one or more of the software applications deployed, or to be deployed, on the given vehicle;
determine one or more fallback deployment plans for the given vehicle, wherein the one or more fallback deployment plans are determined for the one or more received failure scenarios using the vehicle graph; and
provide a deployment plan bundle for transmission to the given vehicle, the deployment plan bundle comprising the primary deployment plan and the one or more fallback deployment plans.

2. The system of claim 1, wherein to determine the one or more fallback deployment plans, the vehicle software deployment system is configured to:
access a set of one or more certified deployment plans for the given vehicle; and
select, from the set of one or more certified deployment plans, a given certified deployment plan that has been certified for a vehicle configuration corresponding to a given failure scenario for which the respective fallback deployment plan is being determined.

3. The system of claim 1, wherein to determine the one or more fallback deployment plans, the vehicle software deployment system is configured to:
access a set of one or more certified deployment plans for the given vehicle; and
in response to determining that the set does not include a deployment plan that has been certified for a vehicle configuration corresponding to a given failure scenario for which the respective fallback deployment plan is being determined, initiate a certification process for certifying a deployment plan for a vehicle configuration corresponding to the given failure scenario for which the respective fallback deployment plan is being determined.

4. The system of claim 1, further comprising:
one or more computing devices configured to implement a vehicle software test system configured to:
receive or access a test plan for certifying one or more software applications for use in the given vehicle when configured according to a given one of the one or more failure scenarios corresponding to a given one of the one or more fallback deployment plans;
determine respective configurations for virtual electronic control units (vECUs) to be used to simulate respective ones of the ECUs of the vehicle deployment graph with the given failure scenario implemented;
determine virtual bus connectivity configuration for the vECUs based on the connectivity configuration of the ECUs indicated in the vehicle deployment graph with the given failure scenario implemented;
provide computing resources configured as the vECUs having the determined respective configurations and configured in a network configuration that implements the determined virtual bus connectivity configuration;
deploy the one or more software applications to at least one of the provided computing resources configured as a vECU; and
perform the test plan to certify the one or more software applications for use in the given vehicle with the given failure scenario implemented.

5. The system of claim 1, wherein the graph of the given vehicle comprises:
edges indicating software dependencies between software applications deployed on respective ones of the ECUs.

6. The system of claim 5, wherein the graph of the given vehicle further comprises:
indications of resource allocations on the respective ones of the ECUs that are allocated to the software applications deployed on the respective ones of the ECUs.

7. A method, comprising:
receiving, at a vehicle software deployment system, a vehicle graph of a vehicle, wherein the vehicle graph indicates respective configurations of one or more electronic control units (ECUs) of the vehicle and a connectivity configuration of the ECUs of the vehicle;
receiving, at the vehicle software deployment system, one or more failure scenarios for the vehicle;
determining, via the vehicle software deployment system, a primary deployment plan for one or more software applications deployed, or to be deployed, on the vehicle;
determining, via the vehicle software deployment system, one or more fallback deployment plans for the vehicle, wherein the one or more fallback deployment plans are determined for the one or more received failure scenarios using the vehicle graph; and
providing, by the vehicle software deployment system, a deployment plan bundle comprising the primary deployment plan and the one or more fallback deployment plans.

8. The method of claim 7, further comprising:
causing performance testing to be performed, by the vehicle software deployment system, for one or more software applications to be deployed in the one or more fallback deployment plans, wherein the performance testing is performed using a hardware configuration corresponding to a failure scenario associated with the respective fallback deployment plan being tested; and
certifying, by the vehicle software deployment system, one or more of the fallback deployment plans, in response to receive results of the performance testing indicating a result exceeding a threshold level of performance.

9. The method of claim 8, further comprising:
performing the performance testing using a virtual vehicle software test system.

10. The method of claim 9, wherein said performing the testing using the virtual vehicle software test system comprises:
accessing a test plan for certifying the one or more software applications to be deployed in the one or more fallback deployment plans;
determining respective configurations for virtual electronic control units (vECUs) to be used to simulate respective ones of the ECUs of the vehicle graph with respective ones of the one or more failure scenarios implemented; and performing the performance testing using computing resources configured as the vECUs having the determined respective configurations and configured in a network configuration that implements a virtual bus connectivity configuration for the one or more failure scenarios.

11. The method of claim 7, further comprising:

receiving, via a user interface of the vehicle software deployment system, an indication of the one or more failure scenarios for which the one or more fallback deployment plans are to be determined, wherein said determining the one or more fallback deployment plans is performed using the one or more failure scenarios received via the user interface.

12. The method of claim 11, further comprising:

receiving, via the user interface of the vehicle software deployment system, information indicating a prioritization of at least some of the software applications relative to other ones of the software applications, wherein the information indicating the prioritization is used in determining applications to be deployed in the one or more fallback deployment plans.

13. The method of claim 12, further comprising:

omitting, in one or more of the fallback deployment plans, software applications with a lesser priority when ECU capacity constraints of a respective failure scenario being evaluated prevent deployment of a full set of the software applications deployed in the primary deployment plan.

14. The method of claim 7, wherein the vehicle graph of the vehicle is included in a vehicle shadow maintained for the vehicle.

15. The method of claim 14, further comprising:

receiving, by a vehicle shadow system, one or more indications of changes in hardware or software of the vehicle; and updating the vehicle shadow, wherein said updating comprises updating the vehicle graph to reflect the one or more changes in hardware or software of the vehicle.

16. One or more non-transitory, computer-readable, storage media storing program instructions that, when executed using one or more processors, cause the one or more processors to:

access a vehicle graph of a vehicle, wherein the vehicle graph indicates respective configurations of one or more electronic control units (ECUs) of the vehicle and a connectivity configuration of the ECUs of the vehicle;

access one or more failure scenarios for the vehicle;

determine a primary deployment plan for one or more software applications deployed, or to be deployed, on the vehicle;

determine one or more fallback deployment plans for the vehicle, wherein the one or more fallback deployment plans are determined for the one or more received failure scenarios using the vehicle graph; and provide a deployment plan bundle comprising the primary deployment plan and the one or more fallback deployment plans.

17. The one or more, non-transitory, computer-readable storage media of claim 16, wherein to determine the one or more fallback deployment plans the program instructions, when executed on or across the one or more processors, further cause the one or more processors to:

select the one or more fallback deployment plans from a set of deployment plans that have been certified for implementing the one or more software applications on vehicles having an ECU configuration and a connectivity configuration as indicated in the vehicle graph with a given failure scenario active.

18. The one or more, non-transitory, computer-readable storage media of claim 16, wherein to determine the one or more fallback deployment plans the program instructions, when executed on or across the one or more processors, further cause the one or more processors to:

in response to determining a set of certified deployment plans does not include a deployment plan for implementing the one or more software applications on vehicles having an ECU configuration and a connectivity configuration indicated in the vehicle graph with a given failure scenario active, cause a certification process to be initiated to certify an additional deployment plan having the ECU configuration and the connectivity configuration indicated in the vehicle graph with the given failure scenario active.

19. The one or more, non-transitory, computer-readable storage media of claim 18, wherein the program instructions, when executed on or across the one or more processors, further cause the one or more processors to:

receive or access a test plan for certifying one or more software applications for use in the given vehicle when configured with the given failure scenario active;

determine respective configurations for virtual electronic control units (vECUs) to be used to simulate respective ones of the ECUs of the vehicle deployment graph with the given failure scenario active;

determine virtual bus connectivity configuration for the vECUs based on the connectivity configuration of the ECUs indicated in the vehicle deployment graph with the given failure scenario active;

provide computing resources configured as the vECUs having the determined respective configurations and configured in a network configuration that implements the determined virtual bus connectivity configuration;

deploy the one or more software applications to at least one of the provided computing resources configured as a vECU; and perform the test plan to certify the one or more software applications for use in the given vehicle with the given failure scenario active, wherein the test plan is performed using:

at least one virtual vehicle represented by the computing resources configured as the vECUs; and at least one real-world vehicle.

20. The one or more, non-transitory, computer-readable storage media of claim 16, wherein the graph of the vehicle comprises:

edges indicating software dependencies between software applications deployed on respective ones of the ECUs; and resource allocations for respective ones of the one or more software applications implemented on the respective ones of the ECUs.

* * * * *